US012196460B2

(12) United States Patent
Fromm et al.

(10) Patent No.: US 12,196,460 B2
(45) Date of Patent: *Jan. 14, 2025

(54) THERMAL CONTROL DEVICE AND METHODS OF USE

(71) Applicant: Cepheid, Sunnyvale, CA (US)

(72) Inventors: David Fromm, Sunnyvale, CA (US); Tien Phan, Sunnyvale, CA (US); Matthew Piccini, Sunnyvale, CA (US)

(73) Assignee: Cepheid, Sunnyvale, CA (US)

(*) Notice: Subject to any disclaimer, the term of this patent is extended or adjusted under 35 U.S.C. 154(b) by 221 days.

This patent is subject to a terminal disclaimer.

(21) Appl. No.: 17/338,264

(22) Filed: Jun. 3, 2021

(65) Prior Publication Data

US 2021/0364196 A1 Nov. 25, 2021

Related U.S. Application Data

(62) Division of application No. 16/712,797, filed on Dec. 12, 2019, now Pat. No. 11,073,310, which is a (Continued)

(51) Int. Cl.
*F25B 21/04* (2006.01)
*B01L 7/00* (2006.01)

(52) U.S. Cl.
CPC ................ *F25B 21/04* (2013.01); *B01L 7/52* (2013.01); *B01L 2200/025* (2013.01); (Continued)

(58) Field of Classification Search
CPC ............... B01L 7/52; B01L 2300/1822; B01L 2200/025; F25B 21/04; F25B 2321/0251; F25B 2321/0212
See application file for complete search history.

(56) References Cited

U.S. PATENT DOCUMENTS

| | | |
|---|---|---|
| 5,061,630 A | 10/1991 | Knopf et al. |
| 6,121,539 A | 9/2000 | Johnson |

(Continued)

FOREIGN PATENT DOCUMENTS

| | | |
|---|---|---|
| CN | 101558145 A | 10/2009 |
| CN | 101585009 A | 11/2009 |

(Continued)

*Primary Examiner* — Shogo Sasaki

(74) *Attorney, Agent, or Firm* — Potomac Law Group, PLLC; Reza Mollaaghababa; Michael J. Bastian

(57) ABSTRACT

Thermal control devices adapted to provide improved control and efficiency in temperature cycling are provided herein. Such thermal control device can include a thermoelectric cooler controlled in coordination with another thermal manipulation device to control an opposing face of the thermoelectric cooler and/or a microenvironment. Some such thermal control devices include a first and second thermoelectric cooler separated by a thermal capacitor. The thermal control devices can be configured in a planar configuration with a means for thermally coupling with a planar reaction vessel of a sample analyzer for use in thermal cycling in a polymerase chain reaction of the fluid sample in the reaction vessel. Methods of thermal cycling using such a thermal control devices are also provided.

24 Claims, 12 Drawing Sheets

Related U.S. Application Data division of application No. 15/217,902, filed on Jul. 22, 2016, now Pat. No. 10,544,966.

(60) Provisional application No. 62/196,267, filed on Jul. 23, 2015.

(52) U.S. Cl.
CPC ................. *B01L 2300/1822* (2013.01); *F25B 2321/0212* (2013.01); *F25B 2321/0251* (2013.01)

(56) References Cited

U.S. PATENT DOCUMENTS

| | | | |
|---|---|---|---|
| 6,262,357 | B1 | 7/2001 | Johnson |
| 6,278,049 | B1 | 8/2001 | Johnson |
| 6,345,507 | B1 | 2/2002 | Gillen |
| 6,499,306 | B2 | 12/2002 | Gillen |
| 6,556,752 | B2 | 4/2003 | Fang |
| 7,082,772 | B2 | 8/2006 | Welch |
| 7,133,726 | B1 | 11/2006 | Attwood |
| 7,164,077 | B2 | 1/2007 | Venkatasubramanian |
| 7,305,843 | B2 | 12/2007 | Quisenberry |
| 7,544,506 | B2 | 6/2009 | Breidford |
| 7,645,070 | B2 | 1/2010 | Attwood |
| 7,686,069 | B2 | 3/2010 | Parish |
| 7,812,246 | B2 | 10/2010 | Kondoh |
| 8,039,726 | B2 | 10/2011 | Zhang |
| 8,186,892 | B2 | 5/2012 | Hosking |
| 8,246,243 | B2 | 8/2012 | Atwood |
| 8,248,173 | B2 | 8/2012 | Shanfield |
| 8,348,503 | B2 | 1/2013 | Brody |
| 8,378,453 | B2 | 3/2013 | Fedorov |
| 8,513,577 | B2 | 8/2013 | Chen |
| 8,552,541 | B2 | 10/2013 | Lim |
| 8,686,277 | B2 | 4/2014 | Farahani |
| 8,695,355 | B2 | 4/2014 | Maltezos |
| 8,788,860 | B2 | 7/2014 | Monferrer |
| 8,856,569 | B2 | 10/2014 | Monferrer |
| 8,952,480 | B2 | 2/2015 | Radhakrishnan |
| 8,945,843 | B2 | 3/2015 | Alvino |
| 9,134,054 | B2 | 9/2015 | Connolly |
| 9,228,763 | B2 | 1/2016 | Kim |
| 2002/0121094 | A1 | 9/2002 | Vanhoudt |
| 2002/0156509 | A1 | 10/2002 | Cheung |
| 2004/0149725 | A1 | 8/2004 | Brown |
| 2005/0145273 | A1 | 7/2005 | Atwood et al. |
| 2006/0016469 | A1 | 1/2006 | Kondoh |
| 2007/0257766 | A1 | 11/2007 | Richards |
| 2008/0271771 | A1 | 11/2008 | Takahashi |
| 2009/0000652 | A1 | 1/2009 | Von Windheim |
| 2009/0120104 | A1 | 5/2009 | Federer |
| 2010/0006132 | A1 | 1/2010 | Hodes |
| 2011/0165628 | A1 | 7/2011 | Verhaar et al. |
| 2011/0275055 | A1 | 11/2011 | Conner |
| 2012/0040856 | A1* | 2/2012 | Alessi ................... B01L 3/5027 506/9 |
| 2012/0149020 | A1* | 6/2012 | Alvino ...................... B01L 7/52 435/6.12 |
| 2015/0231636 | A1 | 8/2015 | Lim |

FOREIGN PATENT DOCUMENTS

| | | | |
|---|---|---|---|
| WO | 2001/008801 | A1 | 2/2001 |
| WO | 2004/042835 | A1 | 5/2004 |
| WO | 2004/111741 | A1 | 12/2004 |
| WO | 2005/050717 | A1 | 6/2005 |
| WO | 2006/048808 | A1 | 5/2006 |
| WO | 2006/110858 | A1 | 10/2006 |
| WO | 2010/008495 | A1 | 1/2010 |
| WO | 2011/083462 | A1 | 7/2011 |
| WO | 2013/033654 | A1 | 3/2013 |
| WO | 2013/169874 | A1 | 11/2013 |
| WO | 2015/126621 | A1 | 8/2015 |
| WO | 2015/166474 | A1 | 11/2015 |

* cited by examiner

Thermo-cycling performance for cycles 1-5 (top) remains constant after 5,000 cycles (cycles 4,995-5,000 at bottom).

FIG. 10
Set-point 1
Set-point 2
DeltaRise
DeltaFall

| | | SEC TEC (T1) | Heat Input (T2) | PRI TEC (T3) | Tube Face (T4) | Sample (T5) | Tube Face (T6) | Block/Air (T7) | Block Temp (T8) |
|---|---|---|---|---|---|---|---|---|---|
| Physically Measured | ✓ | | | ✓ | | | | | ✓ |
| Modeled Outputs | | ✓ | ✓ | ✓ | ✓ | ✓ | ✓ | ✓ | |
| Model Inputs | ✓ | | ✓ | | | | | | ✓ |
| Used To Correct Predictions in K Filter | | ✓ | | ✓ | | | | | |
| Feedback For Thermal Regulation Loop | | | | | | ✓ | | | |

THERMAL CONTROL DEVICE AND METHODS OF USE

CROSS-REFERENCES TO RELATED APPLICATIONS

This application is a divisional of U.S. application Ser. No. 16/712,797, filed Dec. 12, 2019 (now U.S. Pat. No. 10,544,966), which is a divisional of U.S. application Ser. No. 15/217,902, filed Jul. 22, 2016 (now U.S. Pat. No. 11,073,310), which claims the benefit of priority of U.S. Provisional Patent Application No. 62/196,267 entitled "Thermal Control Device and Methods of Use," filed on Jul. 23, 2015; the entire contents of which are incorporated herein by reference.

This application is generally related to U.S. patent application Ser. No. 13/843,739 entitled "Honeycomb tube," filed on Mar. 15, 2013; U.S. Pat. No. 8,048,386 entitled "Fluid Processing and Control," filed Feb. 25, 2002; and U.S. Pat. No. 6,374,684 entitled "Fluid Control and Processing System," filed Aug. 25, 2000; each of which is incorporated herein by reference in its entirety for all purposes.

BACKGROUND OF THE INVENTION

The present invention relates generally to thermal control devices, more particularly to a device, system and methods for thermal cycling in a nucleic acid analysis.

Various biological testing procedures require thermal cycling to facilitate a chemical reaction via heat exchange. One example of such a procedure is polymerase chain reaction (PCR) for DNA amplification. Further examples include, rapid-PCR, ligase chain reaction (LCR), self-sustained sequence replication, enzyme kinetic studies, homogeneous ligand binding assays, and complex biochemical mechanistic studies that require complex temperature changes.

Such procedures require a system that can accurately raise and lower sample temperatures rapidly and with precision. Conventional systems typically use cooling devices (e.g., fans) that occupy a large amount physical space and require significant power to provide a required amount of performance (i.e., a rapid temperature drop). Fan based cooling systems have issues with start-up lag time and shutdown overlap, that is, they will function after being shut off and thus do not operate with rapid digital-like precision. For example, a centrifugal fan will not instantly blow at full volumetric capability when turned on and will also continue to rotate just after power is shut off, thus implementing overlap time that must be accounted for in testing. Such lag and overlap issues frequently become worse with device age.

The fan based cooling systems have typically provided for systems with low cost, relatively acceptable performance and easy implementation, thus providing the industry with little incentive to resolve these issues. The answer thus far has been to incorporate more powerful fans having greater volumetric output rates, which also increase space and power requirements. One price of this is a negative effect on portability of field testing systems, which can be used, for example, to rapidly detect viral/bacterial outbreaks in outlying areas. Another problem is that this approach is less successful in higher temperature environments, such as may be found in tropical regions. Accordingly, there is an unanswered need to address the deficiencies of known heating/cooling devices used in biological testing systems.

Thermal cycling is typically a fundamental aspect of most nucleic acid amplification processes, where the temperature of the fluid sample is cycled between a lower annealing temperature (e.g. 60 degrees) and a higher denaturation temperature (e.g. 95 degrees) as many as fifty times. This thermal cycling is typically carried out using a large thermal mass (e.g. an aluminum block) to heat the fluid sample and fans to cool the fluid sample. Because of the large thermal mass of the aluminum block, heating and cooling rates are limited to about 1° C./sec, so that a fifty-cycle PCR process may require two or more hours to complete. In tropical climates, where ambient temperatures can be elevated the cooling rates can be adversely effected thus extending the time for thermal cycling from, for example, 2 hours to 6 hours.

Some commercial instruments provide heating rates on the order of 5° C./second, with cooling rates being significantly less. With these relatively slow heating and cooling rates, it has been observed that some processes, such as PCR, may become inefficient and ineffective. For example, reactions may occur at the intermediate temperatures, creating unwanted and interfering DNA products, such as "primer-dimers" or anomalous amplicons, as well as consuming reagents necessary for the intended PCR reaction. Other processes, such as ligand binding, or other biochemical reactions, when performed in non-uniform temperature environments, similarly suffer from side reactions and products that are potentially deleterious to the analytical method.

For some applications of PCR and other chemical detection methodologies, the sample fluid volume being tested can have a significant impact on the thermal cycling.

Optimization of the nucleic acid amplification process and similar biochemical reaction processes typically require rapid heating and cooling rates such that the desired optimal reaction temperatures can be reached as quickly as possible. This can be particularly challenging when performing thermal cycling in high-temperature environments such as found in tropical climates where facilities may often lack climate control. Such conditions may result in longer thermal cycling times with less specific results (i.e. more undesired side reactions). Therefore, there is an unmet need for thermal control devices with greater heating and cooling rates that are not dependent on the ambient environment and can be produced at low cost and minimal size for inclusion in diagnostic devices. There is further need for thermal control devices that better control temperature cycling within a reaction chamber within the required scope of speed, accuracy, and precision of current generation systems.

BRIEF SUMMARY OF THE INVENTION

The present invention relates to a thermal control device that performs thermal cycling of a biological reaction vessel with improved control, rapidity and efficiency. In a first aspect, the thermal control device includes a first thermoelectric cooler having an active face and a reference face; a second thermoelectric cooler having an active face and a reference face; and a thermal capacitor disposed between the first and second thermoelectric coolers such that the reference face of the first thermoelectric cooler is thermally coupled with the active face of the second thermoelectric cooler through the thermal capacitor. In some embodiments, the thermal control device includes a controller operatively coupled to each of the first and second thermoelectric coolers, the controller configured to operate the second thermoelectric cooler concurrent with the first thermoelectric cooler so as to increase the speed and efficiency in operation of the first thermoelectric cooler as a temperature of the active face of the first thermoelectric cooler changes from an initial temperature to a desired target temperature.

In some embodiments a thermal interposer is positioned between the first and second thermoelectric cooler devices, and in some embodiments, the thermal interposer acts as a thermal capacitor. In some embodiments, the thermal control device includes a thermal capacitor formed of a thermally conductive material of sufficient mass to store sufficient thermal energy to facilitate increased heating and cooling rates of a fluid sample during thermal cycling. In some embodiments, the thermal capacitor includes a material having higher thermal mass than that of the active and/or reference faces of the first and second thermoelectric coolers, which in some embodiments are formed of a ceramic material. In some embodiments, the thermal capacitor is formed of a layer of copper with a thickness of about 10 mm or less, (e.g., about 10, 9, 8, 7, 6, 5, 4, 3, 2, or 1 mm, or less). This configuration allows for a thermal control device of a relatively thin, planar construction so as to be suitable for use with a planar reaction vessel in a nucleic acid analysis device of reduced size.

In some embodiments, the thermal control device includes a first temperature sensor adapted to sense the temperature of the active face of the first thermoelectric cooler; and a second temperature sensor adapted to sense a temperature of the thermal capacitor. In some embodiments, the first and second temperature sensors are coupled with the controller such that operation of the first and second thermoelectric coolers is based, at least in part, on an input from the first and second temperature sensors to the controller, respectively. In some embodiments, the second temperature sensor is embedded or at least in thermal contact with the thermally conductive material of the thermal capacitor. It is appreciated that in any of the embodiments described herein the temperature sensor may be disposed in various other locations so long as the sensor is in thermal contact with the respective layer sufficiently to sense temperature of the layer.

In some embodiments, the thermal control device includes a controller configured with a primary control loop into which the input of the first temperature sensor is provided, and a secondary control loop into which the input of the second temperature sensor is provided. The controller can be configured such that a bandwidth response of the primary control loop is timed faster (or slower) than a bandwidth response of the secondary control loop. Typically, both the primary and secondary control loops are closed-loop. In some embodiments, the control loops are connected in series (as opposed to in parallel). In some embodiments, the controller is configured to cycle between a heating cycle in which the active face of the first thermoelectric cooler is heated to an elevated target temperature and a cooling cycle in which the active face of the first thermoelectric cooler is cooled to a reduced target temperature. The controller can be configured such that the secondary control loop switches the second thermoelectric cooler between heating and cooling modes before the first control loop is switched between heating and cooling so as to thermally load the thermal capacitor. In some embodiments, the secondary control loop maintains a temperature of the thermal capacitor within about 40° C. from the temperature of the active face of the first thermoelectric cooler. In some embodiments, the secondary control loop maintains a temperature of the thermal capacitor within about 5, 10, 15, 20, 25, 30, 35, 40, 45, or 50° C. from the temperature of the active face of the first thermoelectric cooler. The controller can be configured such that efficiency of the first thermoelectric cooler is maintained by operation of the second thermoelectric cooler such that heating and cooling with the active face of the first thermoelectric cooler occurs at a ramp rate of about 10° C. per second. Non-limiting exemplary ramp rates that can be achieved with the instant invention include 20, 19, 18, 17, 16, 15, 14, 13, 12, 11, 10, 9, 8, 7, 6, 5, 4, 3, 2, or 1° C. per second. In some embodiments, the elevated target temperature is about 90° C. or greater and the reduced target temperature is about 40° C. or less. In some embodiments, the reduced target temperature is in the range of about 40° C. to about 75° C. In some embodiments, the reduced target temperature is about 45, 50, 55, 60, 65, or about 70° C.

In some embodiments, the thermal control device further includes a heat sink coupled with the reference face of the second thermoelectric cooler to prevent thermal runaway during cycling. The thermal control device may be constructed in a generally planar configuration and dimensioned to correspond to a planar portion of a reaction vessel tube in a sample analysis device. In some embodiments, the planar size has a length of about 45 mm or less and a width of about 20 mm or less, or a length of about 40 mm by about 12.5 mm, such as about 11 mm by 13 mm, so as to be suitable for use with a reaction vessel in a PCR analysis device. The generally planar configuration can be configured and dimensioned to have a thickness from an active face of the first thermoelectric cooler to an opposite facing side of the heat sink of about 20 mm or less. Advantageously, in some embodiments, the thermal control device can be adapted to engage with a reaction vessel for thermal cycling of the reaction vessel on a single side thereof to allow optical detection of a target analyte from an opposing side of the reaction vessel during thermal cycling. In some embodiments, two thermal control devices are used to heat opposing planar sides of a reaction vessel. In some embodiments, where two thermal control devices are used on opposite sides of the reaction vessel (e.g. two-sided heating), optical detection is carried out by transmitting and receiving optical energy through the minor walls of the reaction vessel, thus allowing for simultaneous heating and optical interrogation of the reaction vessel.

In some embodiments, methods of controlling temperature are provided herein. Such methods include steps of: operating a first thermoelectric cooler having an active face and a reference face to heat and/or cool the active face from an initial temperature to a target temperature; and operating a second thermoelectric cooler (having an active face and a reference face) to increase efficiency of the first thermoelectric cooler as the temperature of the active face of the first thermoelectric cooler changes from the initial temperature to the desired target temperature, the active face of the second thermoelectric cooler being thermally coupled to the reference face of the first thermoelectric cooler through a thermal capacitor. Such methods can further include steps of: operating the first thermoelectric cooler comprises operating a primary control loop having a temperature input from a temperature sensor at the active face of the first thermoelectric cooler, and operating the second thermoelectric cooler comprises operating a secondary control loop having a temperature input from a temperature sensor within the thermal capacitor. In some embodiments, the method further includes: cycling between a heating mode in which the active face of the first thermoelectric device heats to an elevated target temperature and a cooling mode in which the active face is cooled to a reduced target temperature; and storing thermal energy from thermal fluctuations between the heating and cooling modes in the thermal capacitor, the thermal capacitor comprising a layer having increased thermal conductivity as compared to the active and reference faces of the first and second thermoelectric cooling devices, respectively.

Some embodiments of the invention provide for methods of controlling temperature in a thermal cycling reaction. For example, in some embodiments, the invention provides for cycling between a heating mode and a cooling mode of a second thermoelectric device concurrent with cycling between heating and cooling modes of a first thermoelectric device thereby maintaining efficiency of the first thermoelectric device during cycling. In some embodiments, the controller is configured such that a bandwidth response of the primary control loop for the first thermoelectric device is faster than a bandwidth response of the secondary control loop for the second thermoelectric device. The controller can further be configured such that cycling is timed by the controller to switch the second thermoelectric device between modes before switching of the first thermoelectric device between modes so as to thermally load the thermal capacitor. In some applications, the elevated target temperature is about 90° C. or greater and the reduced target temperature is about 75° C. or less.

In some embodiments, methods of controlling temperature further include: maintaining a temperature of the thermal capacitor within about 40° C. from the temperature of the active face of the first thermoelectric cooler by controlled operation of the second thermoelectric cooler during cycling of the first thermoelectric cooler so as to maintain an efficiency of the first thermoelectric cooler during cycling. In some embodiments, the efficiency of the first thermoelectric cooler is maintained by operation of the second thermoelectric cooler such that heating and/or cooling with the active face of the first thermoelectric cooler occurs at a ramp rate of within 10° C. per second or less. Such methods may further include: operating a heat sink coupled with the reference face of the second thermoelectric cooler during thermal cycling with the first and second thermoelectric coolers so as to prevent thermal runaway.

In some embodiments, methods for thermal cycling in a polymerase chain reaction process are provided herein. Such methods may include steps of: engaging the thermal control device with a reaction vessel having a fluid sample contained therein for performing a polymerase chain reaction for amplifying a target polynucleotide contained in the fluid sample such that the active face of the first thermoelectric cooler thermally engages the reaction vessel; and thermal cycling the thermal control device according to a particular protocol to heat and cool the fluid sample during the PCR process. In some embodiments, engaging the thermal control device with the reaction vessel comprises engaging the active face of the first thermoelectric cooler against one side of the reaction vessel such that an opposite side remains uncovered by the thermal device to allow optical detection from the opposite side. In some embodiments, each of the heating mode and cooling mode have one or more operative parameters, wherein the one or more operative parameters are asymmetric between the heating and cooling mode. For example, each of the heating mode and cooling mode has a bandwidth and a loop gain, wherein the band width and the loop gains of the heating mode and cooling mode are different.

In some embodiments, methods of controlling temperature with a thermal control device are provided. Such methods include steps of: providing a thermal control device a first and second thermoelectric cooler with a thermal capacitor there between, wherein each of the first and second thermoelectric coolers have an active face and a reference face; heating the active face; cooling the active face; heating the reference face; and cooling the reference face. In some embodiments, each active heating face and each active cooling face is controlled by one or more operative parameters. In some embodiments, a magnitude of the one or more operative parameters are different during heating the active face as compared to cooling the active face.

In any of the embodiments described which include first and second thermoelectric coolers, the second thermoelectric cooler can be replaced with a thermal manipulation device. Such thermal manipulation device includes any of a heater, a cooler or any means suitable for adjusting a temperature. In some embodiments, the thermal manipulation device is included in a microenvironment common to the first thermoelectric cooler such that operation of the thermal manipulation device changes the temperature of the microenvironment relative an ambient temperature. In this aspect, the device changes ambient environment to allow the first thermoelectric cooler to cycle between a first temperature (e.g. an amplification temperature between 60-70° C.) and a second higher temperature (e.g. a denaturation temperature of about 95° C.), cycling between these temperatures as rapidly as possible. If both the first and second temperatures are above the true ambient temperature, it is more efficient for a second heat source (e.g. thermoelectric cooler or heater) within a microenvironment to raise the temperature within the microenvironment above the ambient temperature. Alternatively, if the ambient temperature exceeds the second, higher temperature, the thermal manipulation device could cool the microenvironment to an ideal temperature to allow rapid cycling between the first and second temperatures more effectively. In some embodiments, the microenvironment includes a thermal interposer between the first thermal electric device and the thermal manipulation device.

In some embodiments, the thermal control device includes a first thermoelectric cooler having an active face and a reference face, a thermal manipulation device, and a controller operatively coupled to each of the first thermoelectric cooler and the thermal manipulation device. The controller can be configured to operate the first thermoelectric cooler in coordination with the thermal manipulation device so as to increase efficiency of the first thermoelectric cooler as a temperature of the active face of the first thermoelectric cooler changes from an initial temperature to a desired target temperature. The thermal manipulation devices can include a thermo-resistive heating element or a second thermoelectric cooler or any suitable means for adjusting temperature.

In some embodiments, the thermal control device further includes one or more temperature sensors coupled with the controller and disposed along or near the first thermoelectric cooler, the thermal manipulation device and/or a microenvironment common to the first thermoelectric cooler and the thermal manipulation device. The thermal manipulation device can be thermally coupled with the first thermoelectric cooler through a microenvironment (which can include a thermal capacitor) defined within an analysis device in which the thermal manipulation device is disposed such that a temperature of the microenvironment can be controlled and adjusted from an ambient temperature outside of the analysis device.

In some embodiments, the thermal control device includes a controller coupled with each of the thermoelectric cooler and the thermal manipulation device that is configured to control temperature so as to control a temperature within a chamber of a reaction vessel in thermal communication with the thermal control device. In some embodiments, the controller is configured to operate the first thermoelectric cooler based on thermal modeling of an in situ reaction chamber temperature within the reaction vessel. The thermal modeling can be performed in real-time and can utilize Kalman filtering depending on the accuracy of the model.

In some embodiments, the thermal control device is disposed within an analysis device and positioned to be in thermal communication with a reaction vessel of a sample cartridge disposed within the analysis device. The controller can be configured to perform thermal cycling in a polymerase chain reaction process within a chamber of the reaction vessel.

In some embodiments, the thermal control device includes a first thermoelectric cooler having an active face and a reference face, a thermal manipulation device, a thermal interposer disposed between the first thermoelectric coolers and the thermal manipulation device such that the reference face of the first thermoelectric cooler is thermally coupled with the thermal manipulation device through the thermal interposer, and a first temperature sensor adapted to sense the temperature of the active face of the first thermoelectric cooler. The device can further include a controller operatively coupled to each of the first thermoelectric cooler and the thermal manipulation device. The controller can be configured to operate the thermal manipulation device in coordination with the first thermoelectric cooler to increase speed and efficiency of the first thermoelectric cooler as a temperature of the active face of the first thermoelectric cooler is changed from an initial temperature to a desired target temperature. In some embodiments, the controller is configured with a closed control loop having a feedback input of a predicted temperature based on a thermal model that includes an input from the first temperature sensor.

DETAILED DESCRIPTION OF THE INVENTION

Figure 1A:
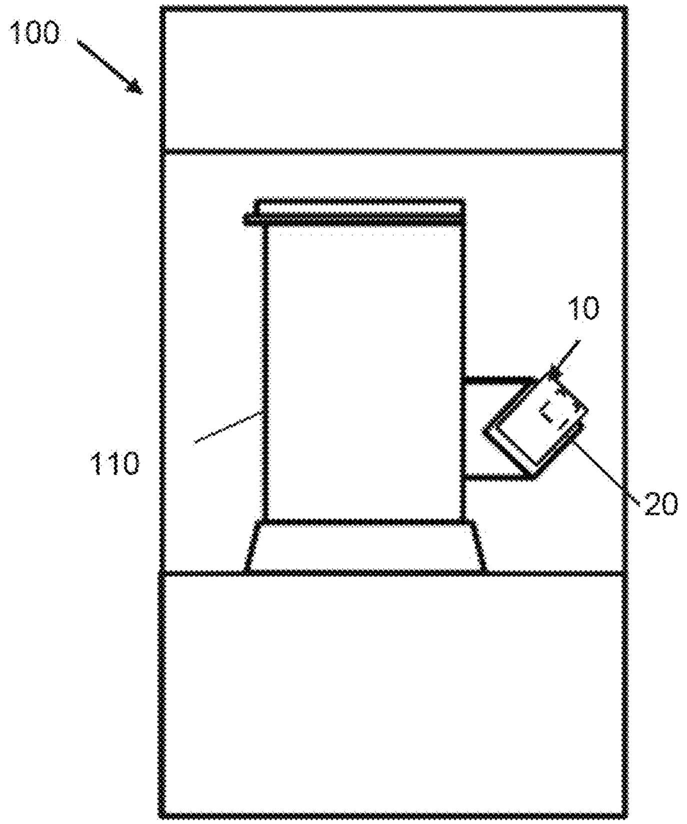
FIGS. 1A-1B provide an overview of a sample analysis system that includes a sample cartridge having a reaction vessel and a thermal control device configured as a removable module adapted for coupling with the reaction vessel in accordance with some embodiments of the invention.

The present invention relates generally to systems, devices and methods for controlling thermal cycles in a chemical reaction, in particular, a thermal control device module adapted for use in controlling thermal cycling in a nucleic acid amplification reaction.

In a first aspect, the invention provides a thermal control device that provides improved control and efficiency in thermal cycling. In some embodiments, such thermal control devices can be configured to perform thermal cycling for a polymerase chain reaction of a fluid sample in the reaction vessel. Such devices can include at least one thermoelectric cooler positioned in direct contact with or immediately adjacent the reaction vessel so that a temperature of the active face of the thermoelectric cooler configurations corresponds to a temperature of the fluid sample with the reaction vessel. This approach assumes sufficient time for thermal conduction to equilibrate the temperature of the fluid sample within the reaction vessel. Such improved thermal control devices can be used to replace existing thermal control devices and thereby provide improved control, speed and efficiency in performing a conventional thermal cycling procedure.

In a second aspect, the improved control and efficiency allowed by the thermal control devices described herein allow such devices to be configured to perform an optimized thermal cycling procedure. In some embodiments, such thermal control devices can be configured to perform thermal cycling that utilizes a thermal model of a temperature within a chamber of a reaction vessel to perform a polymerase chain reaction of a fluid sample in the reaction vessel. This thermal modeling can be implemented within the controller of the thermal control device. Such thermal modeling can utilize a model based on theoretical and/or empirical values or can utilize real-time modeling. Such modeling can further use Kalman filtering to provide a more accurate estimate of temperatures within the reaction vessel. This approach allows for faster and more efficient thermal cycling than conventional thermal cycling procedures.

Either of the above approaches to thermal cycling can be performed by the thermal control devices described herein. In some embodiments, the thermal control device utilizes a first thermoelectric cooler with an active face thermally engaged with a reaction vessel within a biological sample analysis device and utilizes another thermal manipulation device (e.g. second thermoelectric cooler, heater, cooler) to control a temperature of the opposing reference face of the first thermoelectric cooler. In some embodiments, the thermal control device includes first and second thermoelectric coolers that are thermally coupled through a thermal capacitor with sufficient thermal conductivity and mass to transfer and store thermal energy so as to reduce time when switching between heating and cooling, thereby providing faster and more efficient thermal cycling. In some embodiments, the device utilizes a thermistor within the first thermoelectric cooler device and another thermistor within the thermal capacitor layer and operates using first and second closed control loops based on the temperature of the first and second thermistor, respectively. In order to utilize the stored thermal energy in the thermal capacitor layer, the second control loop may be configured to lead or lag the first control loop. By using one or more of these aspects described herein, embodiments of the present invention provide a faster, more robust thermal control device for performing rapid thermal cycling, preferably in about 2 hours or less, even in problematic high temperature environments described above.

I. Exemplary System Overview

A. Biological Sample Analysis Device

In some embodiments, the invention relates to a thermal control device adapted for use with a reaction vessel in a sample analysis device and configured to control thermal cycling in the reaction vessel for conducting a nucleic acid amplification reaction. In some embodiments, the thermal control device is configured as a removable module that couples with and/or maintains contact with the reaction vessel so as to allow thermal cycling as needed for a particular analysis, for example to allow amplification of a target analyte in a fluid sample disposed within the reaction vessel. In some embodiments, the thermal control device has a planar configuration and is sized and dimensioned to correspond to a planar portion of the reaction vessel of which thermal cycling is desired. In some embodiments, the thermal control device includes a coupling portion or mechanism by which the thermal control device is maintained in contact with and/or close proximity to at least one side of the reaction vessel thereby facilitating the heating and cooling of a fluid sample contained therein. In other embodiments, the thermal control device is secured by a fixture or other means in a suitable position for controlling thermal cycling within the reaction vessel. For example, the thermal control device may be affixed within a sample analysis device in which a disposable sample cartridge is placed such that when the sample cartridge is in position for conducting testing for a target analyte, the thermal control device is in a suitable position for controlling thermal cycling therein.

In some embodiments, the thermal control device is configured as a removable module that can be coupled with a reaction vessel or tube extending from a sample analysis cartridge configured for detection of a nucleic acid target in a nucleic acid amplification test (NAAT), e.g., Polymerase Chain Reaction (PCR) assay. Preparation of a fluid sample in such a cartridge generally involves a series of processing steps, which can include chemical, electrical, mechanical, thermal, optical or acoustical processing steps according to a specific protocol. Such steps can be used to perform various sample preparation functions, such as cell capture, cell lysis, purification, binding of analyte, and/or binding of unwanted material. Such a sample processing cartridge can include one or more chambers suited to perform the sample preparation steps. A sample cartridge suitable for use with the invention is shown and described in U.S. Pat. No. 6,374,684, entitled "Fluid Control and Processing System" filed Aug. 25, 2000, and U.S. Pat. No. 8,048,386, entitled "Fluid Processing and Control," filed Feb. 25, 2002, the entire contents of which are incorporated herein by reference in their entirety for all purposes.

In one aspect, the thermal control device is configured for use with a disposable assay cartridge comprising a reaction vessel. In some embodiments, the thermal control device is configured for use with a non-instrumented disposable assembly that facilitates complex fluidic management and processing tasks. This disposable assembly comprising a reaction vessel enables a complex, yet coordinated effort of mixing, lysing, and multiplexed delivery of reagents and samples to a final detection destination, an onboard chamber in a reaction vessel. Inside this reaction chamber is where intricate biochemical processes are carried out, such that it is critical to maintain accurate environmental conditions for the reaction to be successful and efficient. It is particularly important to PCR and rtPCR reactions to cycle temperatures rapidly and accurately, and doing so without a physical sensor at the reaction site proves challenging if not impossible. Current approaches use temperature offsets (calibrations) from temperature sensors located nearby to estimate what the temperature inside the reaction chamber will be. There are considerable drawbacks with this approach. Even with a small physical separation between temperature sensors and the reaction vessel, offsets are determined at steady state, and most reactions never reach a true steady state due to the physical dynamics of the thermal system coupled with rapid temperature cycling times of the reactions. As such the temperature within the reaction vessel is never truly known. To address this challenge, current approaches typically optimized thermal cycling to find an "ideal" reaction temperatures and thermal setpoint hold times by successively and iterating thermal conditions until success is met. This process is tedious and since the assay designers never truly know what the actual reaction temperature chamber is during the assay, optimized assay performance may never be realized. This process often results in setpoint hold times that are longer than necessary to ensure the temperature of the fluid sample reaches the desired temperature.

Thermal modeling is a different approach, and can be implemented within analysis system by use of the improved thermal control devices described herein. Modeling allows for accurate and precise real-time prediction of in situ reaction chamber temperatures. In addition, thermal modeling also enables the elucidation of dynamics which can be used to better control for speed (cycling times) and set the foundation for a more powerful system for future assay development. More importantly, these models can be validated and tuned to accurately reflect the real world temperature as if the reaction chamber were actually instrumented with a physical sensor. Finally, thermal modeling can account for variations in ambient temperature, which is of vital importance in point-of-care system deployments, where high (or low) ambient temperatures impact reaction chamber temperatures that are otherwise unaccounted for. Thus, assay designers can be assured that temperatures inside the reaction chamber will always be precisely controlled to desired levels.

Kalman filtering is a controls method by which optimal estimation can be arrived at by use of a system model, measurement data acquired off-line (e.g., efficiencies of system elements, material properties, appropriate input powers, and the like), and temperatures measured in real-time. In essence, the algorithm takes what the model predicts for all of its states (e.g., temperatures), combined real-world measured states (e.g., one or more temperature sensors). A proper model also accounts for noise in those measurements (sensor) and noise in the inherent process. The algorithm takes all of this information and applies a dynamic weighted approach that either leverages model predictions over measurement or vice versa, depending on how the current measurements compare to their previous values. To use Kalman algorithms for optimal prediction, the model must be an accurate representation of the physical system.

Figure 1B:
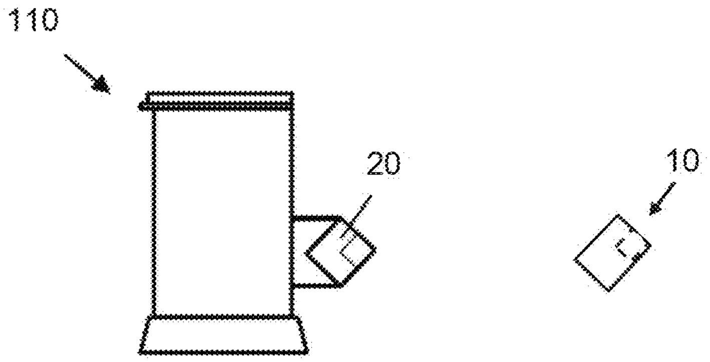

FIG. 1A shows an exemplary sample analysis device 100 for testing of a target analyte in a fluid sample prepared within a disposable sample cartridge 110 received within the device 100. The cartridge includes a reaction vessel 20 through which the prepared fluid sample flows for amplification, excitation and optical detection during a PCR analysis for a target analyte. In some embodiments, the reaction vessel can comprise a plurality of individual reaction wells and/or additional chambers, such as a pre-amp chamber as shown in FIG. 4B. The system further includes a thermal control device 10 disposed adjacent the reaction vessel 20 for controlling thermal cycling of the fluid sample therein during the analysis. FIG. 1B illustrates the thermal control device 10 as a removable module, which allows the thermal control device 10 to be used on other sample cartridges in subsequent analyses. The thermal control device 10 may be configured to interface with electrical contacts within the sample analysis device 100 so as to power the thermal control device during thermal cycling.

Figure 4A:
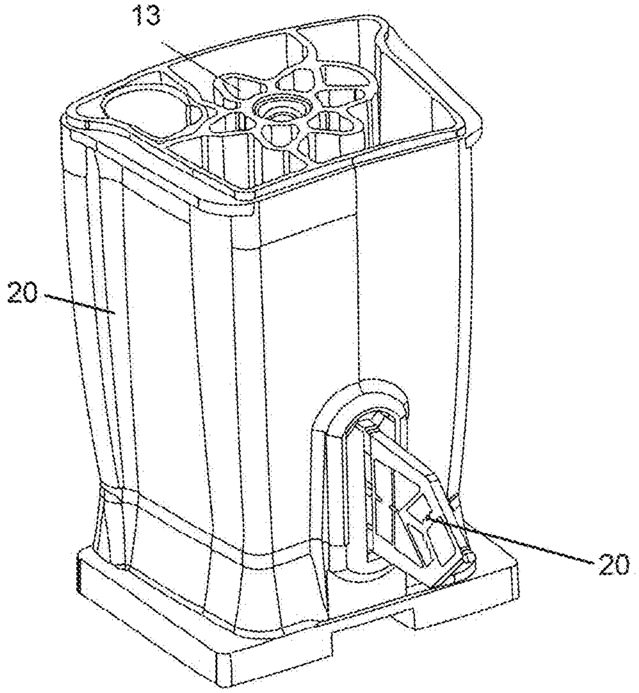
FIGS. 4A-4B show a planar area of a multi-well sample reaction vessel suitable for use with some embodiments of the invention, and for which a thermal control device module can be configured in accordance with some embodiments of the invention.
Figure 4B:
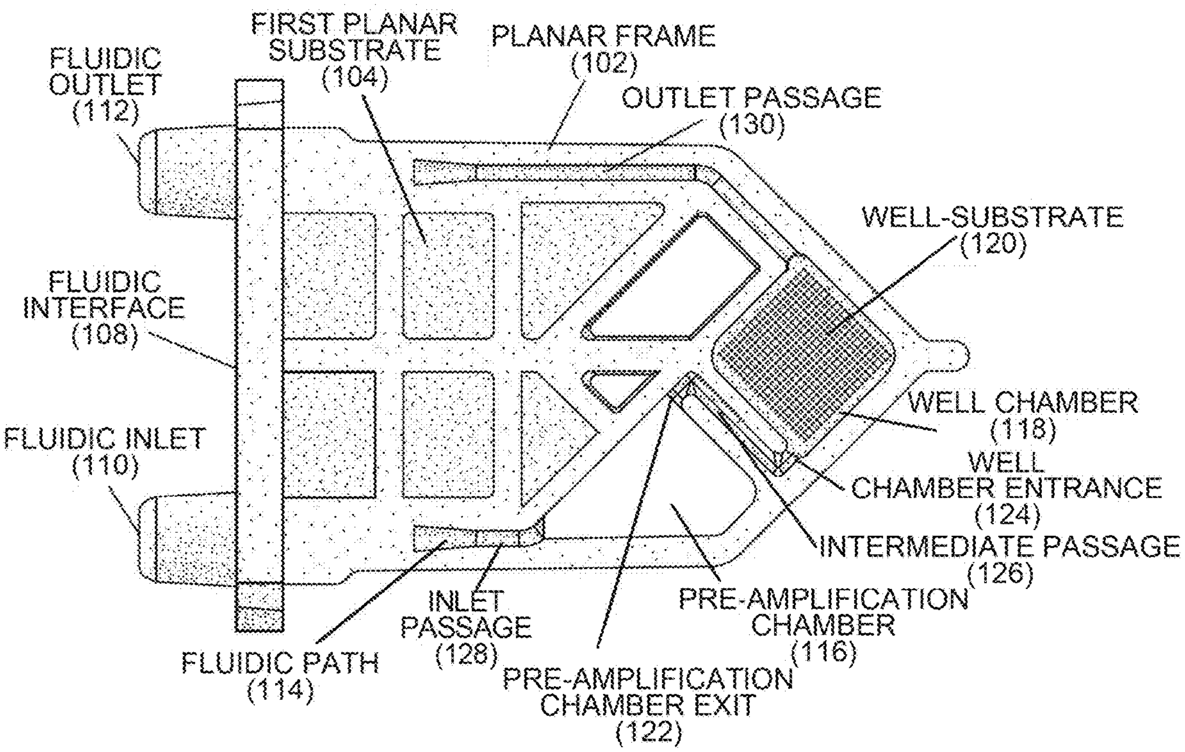

In some embodiments, the thermal control device may be configured for use with a reaction vessel, such as that shown in FIGS. 4A-4B, which illustrate an exemplary sample processing cartridge 110 and associated reaction vessel 20 to allow sample preparation and analysis within a sample processing device 100 that performs sample preparation as well as analyte detection and analysis. As can be seen in FIG. 4A, the exemplary sample processing cartridge 110 includes various components including a main housing having one or more chambers for sample preparation to which a reaction vessel 20, as shown in FIG. 4B, is attached. After the sample processing cartridge 110 and the reaction vessel 20 are assembled (as shown in FIG. 4A), a fluid sample is deposited within a chamber of the cartridge and the cartridge is inserted into a sample analysis device. The device then performs the processing steps needed to perform sample preparation, and the prepared sample is transfer through one of a pair of transfer ports into fluid conduit of a reaction vessel attached to the cartridge housing. The prepared fluid sample is transported into a chamber of the reaction vessel 20, while an excitation means and an optical detection means are used to optically sense the presence or absence of one or more target nucleic acid analytes of interest (e.g., a bacteria, a virus, a pathogen, a toxin, or other target). It is appreciated that such a reaction vessel could include various differing chambers, conduits, processing regions and/or micro-wells for use in detecting the target analyte(s). An exemplary use of such a reaction vessel for analyzing a fluid sample is described in commonly assigned U.S. Pat. No. 6,818,185, entitled “Cartridge for Conducting a Chemical Reaction,” filed May 30, 2000, the entire contents of which are incorporate herein by reference for all purposes.

Non-limiting exemplary nucleic acid amplification methods suitable for use with the invention include, polymerase chain reaction (PCR), reverse-transcriptase PCR (RT-PCR), Ligase chain reaction (LCR), transcription mediated amplification (TMA), and Nucleic Acid Sequence Based Amplification (NASBA). Additional nucleic acid tests suitable for use with the instant invention are well known to persons of skill in the art. Analysis of a fluid sample generally involves a series of steps, which can include optical or chemical detection according to a particular protocol. In some embodiments, a second sample processing device can be used to perform any of the aspects relating to analysis and detection of a target described in U.S. Pat. No. 6,818,185, cited previously and incorporated herein by reference in its entirety.

B. Thermal Control Device

In one aspect, the invention provides a thermal control device adapted to provide improved control of temperature while also providing quick and efficient cycling between at least two different temperature zones. Such thermal control device can include a thermoelectric cooler that is controlled in coordination with another thermal manipulation device. The thermal manipulation device can include a heater, a cooler, another thermoelectric cooler, or any suitable means for modifying temperature. In some embodiments, the device includes use of transparent insulating material to allow optical detection through an insulating portion of the device. The thermal control device can further include use of one or more thermal sensors (e.g. thermocouples), a thermal capacitor, a thermal buffer, a thermal insulator or any combination of these elements. In some embodiments, the thermal manipulation device includes a thermal-resistive heater. In some embodiments, the thermal control device is adapted for one-sided heating of a reaction vessel, while in other embodiments, the device is adapted for two-sided heating (e.g. opposing major faces). It is appreciated that any of the features described herein may be applicable to either approach and is not limited to the particular embodiment in which the feature is described.

In some embodiments, a thermal control device in accordance with embodiments of the invention includes a first thermoelectric cooler and a second thermoelectric cooler separated by a thermal capacitor. The thermal capacitor includes a material having sufficient thermal conductivity and mass to conduct and store thermal energy so as to increase efficiency and speed of thermal heating and/or cooling when switching between thermal heating and cooling cycles with the first and second thermoelectric coolers. In some embodiments, each of the first and second thermoelectric coolers have an active face and a reference face and the thermal capacitor is disposed between the first and second thermoelectric coolers such that the reference face of the first thermoelectric cooler is thermally coupled with the active face of the second thermoelectric cooler through the thermal capacitor. In some embodiments, the thermal capacitor is in direct contact with each of the first and second thermoelectric coolers.

In some embodiments, the thermal control device includes a controller operatively coupled to each of the first and second thermoelectric coolers so as to operate the first and second thermoelectric coolers concurrently so as to maintain and/or increase efficiency of the first thermoelectric cooler during thermal cycling. Such thermal cycling including heating an active face from an initial temperature to a desired target temperature and/or cooling an active face from an initial temperature to a lower desired target temperature.

In some embodiments, the thermal capacitor includes a layer of material of sufficient thermal mass and conductivity so as to absorb and store thermal energy sufficiently to improve efficiency of the first thermoelectric cooler so as to maintain or increase efficiency when heating and/or cooling with the first thermoelectric cooler, and in particular, when switching between heating and cooling during thermal cycling. In some embodiments, the thermal capacitor layer is thinner than either the first and second thermoelectric cooler and has a higher thermal mass per unit thickness than either the first or second thermoelectric cooler. For example, the thermal capacitor may include a metal, such as copper which has sufficient thermal conductivity and a higher thermal mass per unit thickness as compared to the ceramic layers of the first and second thermoelectric cooler. While thicker, lower thermal mass materials can be used as thermal conductive layer, it is advantageous to utilize materials with higher thermal mass relative to the thermal capacitor layer as it allows the entire thermal control device to be of a suitable size and thickness for use with a chemical analysis system of reduced size. Copper is particularly useful as a thermal capacitor as it has relatively high thermal conductivity and relatively high thermal mass to allow the thermal capacitor layer to store thermal energy. In some embodiments, the copper layer has a thickness of about 5 mm or less, typically about 1 mm or less. Non-limiting exemplary materials suitable for use as thermal capacitor with the instant invention include: aluminum, silver, gold, steel, iron, zinc, cobalt, brass, nickel, as well as various non-metallic options (e.g. graphite, high-conductivity carbon, conductive ceramics). Additional materials suitable for use with the instant invention will be well known to persons of skill in the art.

In some embodiments, the thermal control device includes a first thermoelectric cooler and a thermal manipulation device that includes a thermal-resistive heating element. It is appreciated that this thermal manipulation device can replace the second thermoelectric cooler device described in any of the embodiments herein.

II. Thermal Control Device Prototype

This section describes and summarizes the initial design, construction, and performance characterization of a non-limiting exemplary prototype thermal control device in accordance with some embodiments of the invention. This exemplary prototype is an integrated heating/cooling module configured for use in a sample analysis instrument of reduced size for carrying out PCR analysis on a fluid sample.

Due to space constraints and material cost limitations dictated by the instrument specifications for a sample analysis device for which the prototype was configured, alternate methods for heating and cooling the subject reaction vessel are realized. An integrated, all-solid-state heating and cooling module was developed consisting of: two thermoelectric coolers (two Peltier modules), drive electronics, a heat-sink system size appropriate for packaging within the sample analysis instrument, and dual control loops implemented in instrument hardware. In this prototype, the thermal control device module was designed to contact only one side of the reaction vessel, leaving the other side available for optical interrogation of PCR products. It is appreciated that other variations of this design may be realized, for example, thermal control devices could be arranged for dual heating on each of the major faces of the reaction vessel with optical detection occurring through the minor faces of the reaction vessel. Primary specifications tested and met by this prototype system are summarized in Table 1 below:

TABLE 1

Test Summary

| | ERS | Prototype performance | Met requirement? (Y/N) |
|---|---|---|---|
| Reaction Tube Size Accommodation | Up to 100 uL reaction tube volume | Active area >11 × 11 mm; exceeds cross-sectional area of 100 uL reaction tube | Y |
| Thermal Power | Heating/Cooling: 10 W Max | 9 W | Y |
| Closed-loop Heating rate | Rate ≥7° C./sec | Closed-loop heating of ceramic from 50° C. to 95° C. in 6.5 seconds (7° C./sec) | Y |
| Closed-loop Cooling rate | Rate ≥7° C./sec | Closed-loop heating of ceramic from 95° C. to 50° C. in 6.5 seconds (7° C./sec) | Y |
| Operating Temperature range | Ambient to 105° C. | Unit functional at 105° C. | Y |
| Temperature set-point resolution | 0.1° C. | Resolution <0.1° C. | Y |
| Temperature feedback resolution | 0.1° C. | Resolution 0.1° C. | Y |
| Calibration | Stored in EEPROM | Not calibrate | TBD |
| Surface Temperature Uniformity | +/−0.5° C. | TBD | TBD |
| Reliability | TBD | 10,000 cycles OK; lifetime TBD | TBD |

A. Basic Design Principles

In some embodiments, a thermal control device module of the invention utilizes a thermoelectric cooler (TEC), also known as a Peltier cooler. A TEC is a solid-state electronic device consisting of two ceramic plates sandwiching alternating stacks of p- and n-doped semiconductor pillars arranged in a checkerboard-like pattern, wired in series and thermally connected in parallel. When a voltage is applied to the ends of the semiconductors, current flow through the device leads to a significant temperature difference between the two ceramic plates. For forward voltage bias, the top plate will become cooler than the bottom plate (convention considers the face opposite the one with electrical leads the "cold" face) and is used as a solid-state refrigerator. Reversing voltage causes the "cold" face to now become significantly hotter than the bottom face. Thus, TEC devices have long been a popular choice for thermo-cycling applications. TEC heating/cooling efficiency increases dramatically for smaller, low power devices.

Material advances have enabled production of extremely thin (~3 mm) TECs with significantly increased cooling/heating efficiency and an active area comparable to the GX reaction vessel (10×10 mm). Small commercially available TECs typically have efficiency ~60%; reduced waste heat and small size diminish thermal stress damage, the primary failure mode with repeated cycling necessary for PCR. Small TECs are attractive for a nucleic acid assay test system of reduced size because they are a small, inexpensive, integrated heating/cooling solution, and will produce efficient cooling performance over a large ambient temperature range, unlike forced-air cooling whose efficiency suffers with higher ambient temperature.

Efficient TEC heating/cooling depends on three factors. First, care must be taken to limit the thermal load placed on the TEC device. Due to the reaction vessel's small size and typical small reaction volume (<100 ul), thermal load is not a significant concern, although devices should be properly loaded with a buffer-filled reaction vessel for testing. Second, hot and cold heat exchanger performance should be sufficient to dissipate waste heat (about 40% of input system electrical power) with repeated cycling. Failure to manage waste heat can markedly decrease thermal efficiency and, in the worst case, induce system thermal runaway within the entire TEC assembly. In practice, thermal runaway can occur in minutes, where temperatures for the hot and cold faces both become hot enough to de-solder the electrical connections within the device. Because of space constraints within a reduced size analysis system, heat-sink size is limited. Thus, an aluminum heat-sink (chosen because of its high thermal conductivity and heat capacity) with maximized surface area (fins) is integrated along with a small fan to further disperse hot air away from the heat-sink's aluminum/air interface. This unit is sized to be space-appropriate for a portable reduced size nucleic acid analysis system.

For a well behaved TEC system, there are physical limitations to the difference in temperature (dT) achievable between the hot and cold faces of the Peltier device; peak dT ~70° C. for the most efficient TECs commercially available. This dT is sufficient for PCR, since required thermo-cycling temperatures typically range between 45-95° C. Therefore, most Peltier-based PCR systems have a heat-sink at slightly above ambient temperature (~30° C.), and cycle the opposite face from that base temperature. However, thermal efficiency begins to lag as maximum dT is reached. To maintain heating/cooling speed, maximize system efficiency, and minimize system stress, a thermal management has been developed using multiple TEC devices in accordance with embodiments of the invention, such as in the example embodiment shown in FIG. 2.

Figure 2:
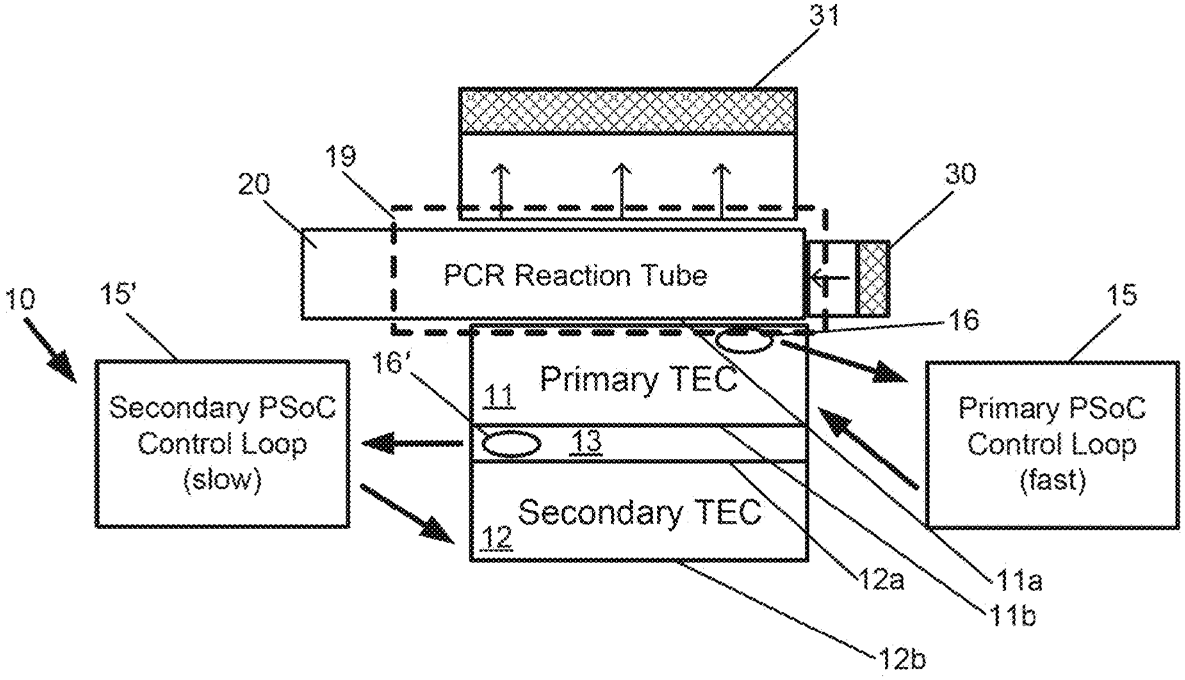
FIG. 2 illustrates a schematic of a thermal control device in accordance with some embodiments of the invention.
Figure 3:
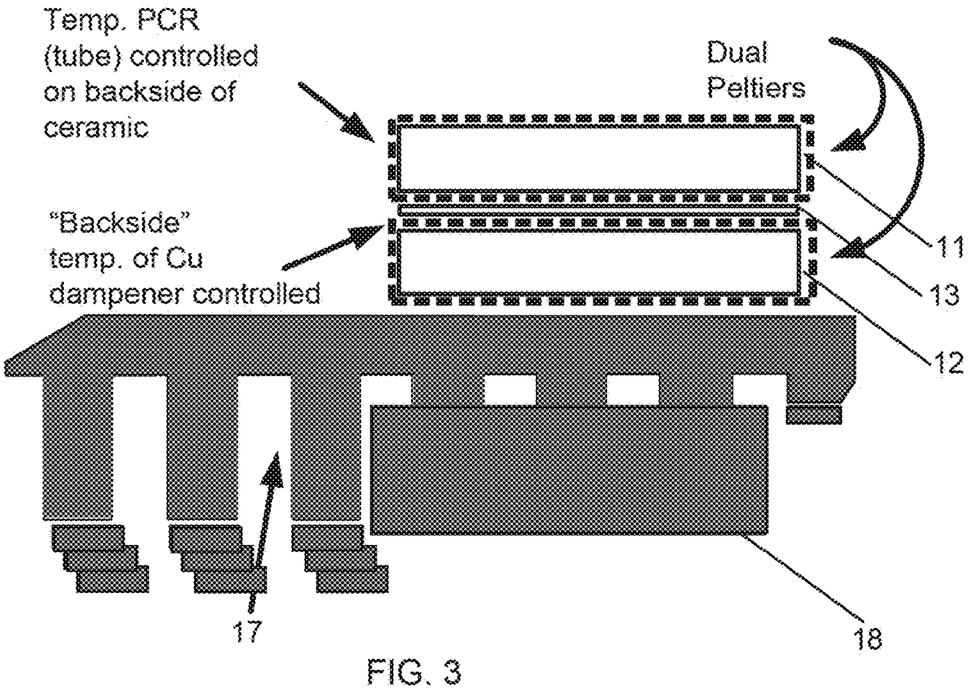
FIG. 3 shows a proto-type of a thermal control device in accordance with some embodiments of the invention.
Figure 5:
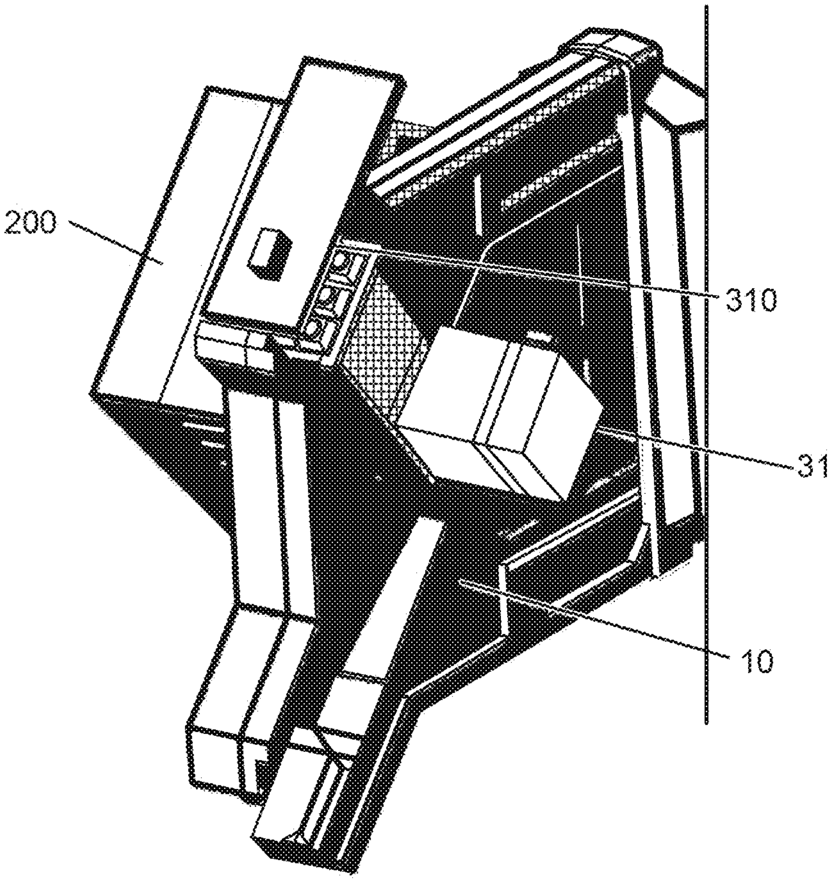
FIG. 5 shows a CAD model of a thermal control device prototype in accordance with some embodiments of the invention.
Figure 6:
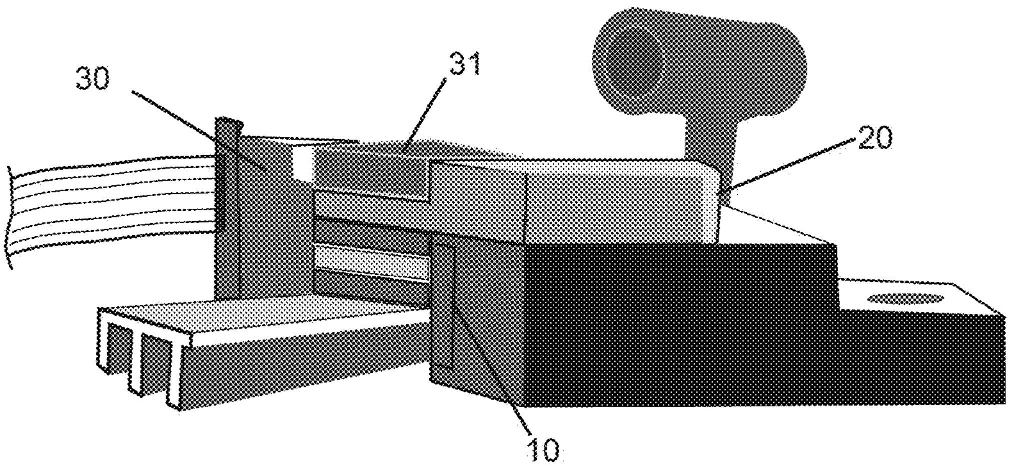
FIG. 6 shows a clamping fixture of a thermal control device for coupling with a reaction vessel in accordance with some embodiments of the invention.

FIG. 2 shows an exemplary thermal control device that includes a first TEC 11 (primary TEC) and a second TEC 12 (secondary TEC) thermally coupled through a thermal capacitor layer 13. The TECs are configured such that an active face 11*a* of the first TEC 11 is thermally coupled with a PCR reaction vessel 20 to facilitate controlling thermal cycling therein. The device may optionally include a coupling fixture 19 for mounting the device on the reaction vessel. In some embodiments, the device may be secured to a fixture that positions the device adjacent the reaction vessel. The opposing reference face 11*b* of the first TEC is thermally coupled with an active face 12*a* of the second TEC 12 through the thermal capacitor layer. This configuration may also be described as the reference face 11*b* being in direct contact with one side of the thermal capacitor layer 13 and the active face 12*a* being in direct contact with the opposite side of the thermal capacitor layer 13. In some embodiments, the reference face 12*b* of the second TEC is thermally coupled with a heat sink 17 and/or a cooling fan 18, such as shown in the embodiment of FIG. 3. In this embodiment, the thermal control device 10 is configured such that it is thermally coupled along one side of a planar portion of the reaction vessel 20 so as to allow optical excitation from another direction (e.g. a side of the reaction vessel) with an optical excitation means 30, such as a laser, and optical detection from another direction (e.g. an opposite side of the reaction vessel) with an optical detection means 31. Another view of such a configuration is shown in FIGS. 5 and 6.

A thermistor 16 is included in the first TEC 11 at or near the active face 11*a* to allow precise control of the temperature of the reaction vessel. The temperature output of this thermistor is used in a primary control loop 15 that controls heating and cooling with active face 11*a*. A second thermistor 16' is included within or near the thermal capacitor layer and an associated temperature output is used in a second control loop 15' that control heating and cooling with the active face 12*a* of the second TEC. In one aspect, the first control loop is faster than the second control loop (e.g. the second control loop lags the first), which accounts for thermal energy transferred and stored within the thermal capacitor layer. By use of the these two control loops, the temperature differential between the active face 11*a* and the reference face 11*b* of the first TEC 11 can be controlled so as to optimize and improve efficiency of the first TEC, which allows for faster and more consistent heating and cooling with the first TEC, while the thermal capacitor allows for more rapid switching between heating and cooling, as described herein and demonstrated in the experimental results presented below.

Instead of bonding a standard heat-sink to the ceramic plate opposite the reaction vessel, another (secondary) TEC is used to maintain a temperature within about 40° C. of the active face of the primary TEC. In some embodiments, two PID (Proportional Integral Derivative gain) control loops are used to maintain this operation. In some embodiments, non-PID control loops are used to maintain the temperature of the active face of the primary TEC. Typically, a fast PID control loop drives the primary TEC to a predetermined temperature setpoint, monitored by a thermistor mounted to the underside of the ceramic plate in contact with the reaction vessel. This loop operates with maximum speed to ensure the control temperature can be quickly and accurately reached. In some embodiments, a second, slower PID control loop maintains the temperature for the bottom face of the primary TEC to maximize thermal efficiency (experimentally determined to be within ~40° C. from the active face temperature). As discussed above, non-PID control loops can also be used to maintain the temperature of the TEC to maximize thermal efficiency. In some embodiments, it is advantageous to dampen the interaction between the two control loops to eliminate one loop from controlling the other. It is further advantageous to absorb and store thermal energy from the first and/or second TEC by use of the thermal capacitor layer to facilitate rapid switching between heating and cooling.

Two non-limiting exemplary ways to achieve rapid and efficient switching between heating and cooling as used in some embodiments of the invention are detailed herein. First, the bandwidth response for the secondary control loop is intentionally limited to be much lower than the fast primary loop, a so-called "lazy loop." Second, a thermal capacitor is sandwiched between two TECs. While it is desirable for the entire thermal control device to be relatively thin to allow use of the device on a small reaction vessel typically used in a PCR process, it is appreciated that the thermal capacitor layer may be thicker so long as it provides sufficient mass and conductivity to function as a thermal capacitor for the TECs on either side of the thermal capacitor. In some embodiments, the thermal capacitor layer is a thin copper plate of about 1 mm thickness or less. Copper is advantageous because of its extremely high thermal conductivity, while 1 mm thickness is experimentally determined to sufficiently dampen the two TECs while providing sufficient mass for the thin layer to store thermal energy so as to act as a thermal capacitor. While copper is particularly useful due to its thermal conductivity and high mass, it is appreciated that various other metals or materials having similar thermal conductivity properties and high mass can be used, preferably materials that are thermally conductive (even if less than either TEC) and with a mass the same or higher than either TEC to allow the layer to operate as a thermal capacitor in storing thermal energy. In another aspect, the thermal capacitor layer may contain a second thermistor which is used to monitor the "backside" temperature (e.g. reference face) used by the secondary PID control loop. Both control loops are digitally implemented within a single PSoC (Programmable System on Chip) chip which sends control signals to two bipolar Peltier current supplies. It will be appreciated by the skilled artisan that in some embodiments, non-PSOC chips can be used for control, e.g., field programmable gate arrays (FPGAs) and the like are suitable for use with the instant invention. In some embodiments, the dual-TEC module includes a heat-sink to prevent thermal runaway, which can be bonded to the backside of the secondary TEC using, e.g., thermally-conductive silver epoxy. Alternative bonding methods and materials suitable for use with the invention are well known to persons of skill in the art.

FIG. 2 shows a schematic of dual-TEC design. Temperature of the PCR reaction vessel (measured by a thermistor, (16) shaded ellipse) is governed by the primary TEC and controlled by a loop in PSoC firmware. Optimal thermal efficiency of the Primary TEC is maintained by a second thermistor (16') (shaded ellipse) in thermal contact with a copper layer, which feeds into a secondary PSoC loop, controlling a second TEC.

B. Initial Prototype Fabrication

FIG. 3 shows a photograph of a prototype dual-TEC heating/cooling module. Both Primary and Secondary TECs (Laird, OptoTEC HOT20,65,F2A,1312, datasheet below) measure 13 (w)×13 (l)×2.2 (t) mm, and have a maximum thermal efficiency ~60%. FIG. 4 compares the planar dimensions of the TECs with a GX reaction vessel. In some embodiments, the planar area affected by the TEC module is matched to the GX reaction vessel. It accommodates reaction vessels having a fluid volume ranging from about 25 μl (pictured) to about 100 μl.

FIG. 3 shows an exemplary prototype dual-TEC module for single-sided heating and cooling of a reaction vessel in a chemical analysis system. As can be seen, the heat-sink includes a mini-fan to flush heat and maintain TEC efficiency. The primary TEC (top) cycles temperature in the reaction vessel, monitored by a thermistor mounted to the under-side of the ceramic in contact with the tube. The "backside" TEC maintains the temperature of an interstitial copper layer (by use of a thermistor) to ensure optimal thermal efficiency of the primary TEC. A heat-sink with integrated mini-fan keeps entire module at thermal equilibrium.

In some embodiments, a small thermistor with +/−0.1° C. temperature tolerance is bonded to the underside of top face of the primary TEC using silver epoxy. This thermistor probes the temperature applied to the reaction vessel and is an input for the primary control loop in the PSoC, which controls the drive current to the primary TEC. The bottom surface of the primary TEC is bonded to a 1 mm-thick copper plate with silver epoxy. The copper plate has a slot containing a second TR136-170 thermistor, potted with silver epoxy to monitor "backside temperature," the signal input for the secondary control loop in the PSoC. The secondary TEC, controlled by the secondary control loop, is then sandwiched between the copper plate and an aluminum heat-sink. The heat-sink is machined to an overall thickness=6.5 mm, keeping the entire package <13 mm thick, and a planar size=40.0 (l)×12.5 (w) mm, necessitated by space constraints within an instrument of reduced size. A 12×12 mm Sunon Mighty Mini Fan is glued within an inset machined into the heat-sink where the TECs interact with the heat-sink. Note the mini-fan does not need to directly cool the heat-sink; a quiet, durable, cheap, low-voltage (3.3V max) brushless motor is sufficient to maintain heat-sink performance by removing hot surface air from the aluminum/air interface using shear flow, as opposed to direct air cooling (as in some conventional analysis devices, such as the GX or other such devices).

Testing of prototype units will determine whether heating/cooling speed, thermal stability, robustness with increased ambient temperature, and overall system reliability is sufficient to meet engineering requirement specifications. Thermal performance has been shown acceptable such that the design goals are met for an exemplary reduced size prototype system: smaller size, robust, and inexpensive (fewer parts needed than with 2-sided heating/cooling). Further, single-sided heating/cooling enables more efficient optical detection through the side of the reaction vessel. FIG. 5 shows a CAD drawing of the dual-TEC module, LED Excite- and Detect-Blocks, and the reaction vessel within an exemplary prototype system.

FIG. 5 shows a CAD model of a dual-TEC heating/cooling module. The reaction vessel is thermal-cycled on one side (first major face of the reaction vessel) and fluorescence detected through the opposite side (second major face of the reaction vessel). LED illumination remains through the edge (minor face) of the reaction vessel.

C. Initial Heating/Cooling Performance

Heating and cooling performance of the exemplary prototype TEC assembly was measured using a custom fixture that securely clamps the TEC assembly against one surface of a reaction vessel (FIG. 6). Care was taken to thermally isolate the TEC assembly from the fixture by making it of a thermally insulating material, such as Delrin. To mimic a thermal load the reaction vessel was filled with a fluid sample and placed in secure contact with a fluorescent detect block prototype on the reaction vessel surface opposite the TEC assembly. It should be noted the temperature on the top TEC surface contacting the reaction vessel in this geometry was independently measured to be equal or higher than the temperature measured on the primary TEC thermistor. Therefore, it is reasonable to use the read temperature of the primary TEC thermistor to initially characterize thermal performance of the dual-TEC heating/cooling system. Any mismatch between thermistor and reaction vessel temperature can be characterized and adjusted for using feedback loops between the primary TEC thermistor and the temperature of the fluid sample in the reaction vessel.

FIG. 6 shows an exemplary clamping fixture for securing the thermal control device to a PCR tube for thermal characterization. In one example, a reaction vessel can be filled with a fluid sample and secured to make thermal contact between the heating/cooling module and one face of the reaction vessel. The other face of the reaction vessel is clamped against a fluorescent detect block. An LED excite block illuminates the solution through a minor face (e.g. edge) of the reaction vessel.

A prototype PSoC control board employed PID control to maintain a temperature setpoint of the primary TEC thermistor and to provide dual-polarity drive current to the TEC devices (positive voltage when heating, negative voltage when cooling), and to power the mini-fan. This PID loop was tuned to maximize performance of the primary TEC. A script was written to cycle the set-point of the reaction vessel between high and low temperature extremes characteristic of PCR thermo-cycling. Specifically, the low temperature set-point=50° C., with a dwell time 12 sec, beginning once the measured temperature is within +/−0.1° C. for a 1 sec. Similarly, the high-temperature set-point=95° C. for 12 sec, beginning once the temperature is maintained +/−0.1° C. from the setpoint for 1 sec. The script cycled between 50° C. and 95° C. ad infinitum.

The secondary control loop was also maintained within the same PSoC chip, reading the temperature of the secondary thermistor in thermal contact with the copper dampening/thermal capacitor layer (see FIG. 2) and acting upon the secondary TEC. A different set of PID tuning parameters was found to properly maintain system thermal performance by controlling the temperature of this copper layer, so-called the "backside" temperature. This control loop had a significantly lower bandwidth than the primary TEC control loop, as expected. The PSoC and associated program also allow multiple set-points of backside temperature, which is useful in maximizing ramp rate performance by keeping the primary TEC operating under optimally efficient thermal conditions.

Figure 7:
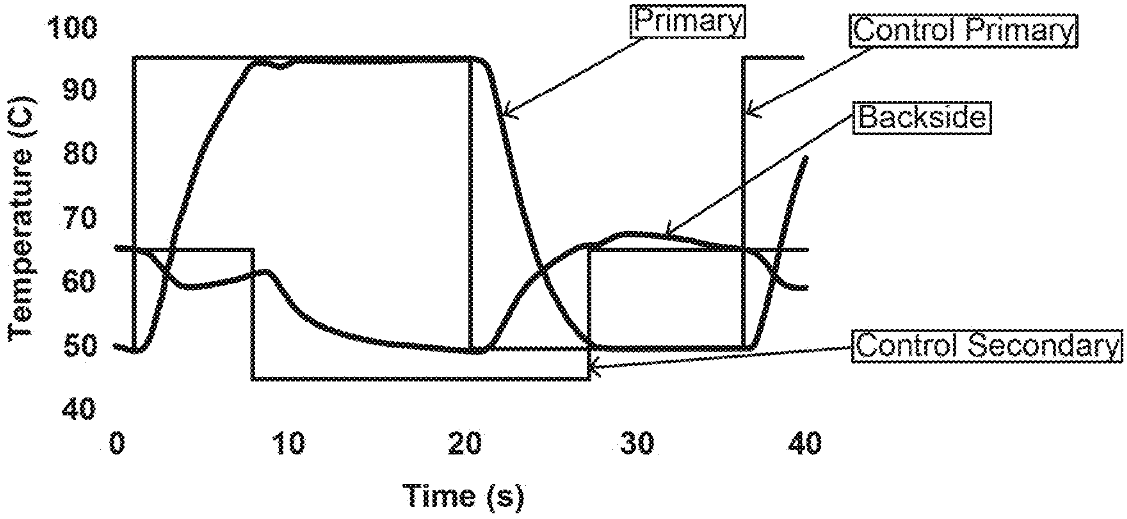
FIG. 7 shows a thermal cycle under closed loop control in accordance with some embodiments of the invention.
Figure 8:
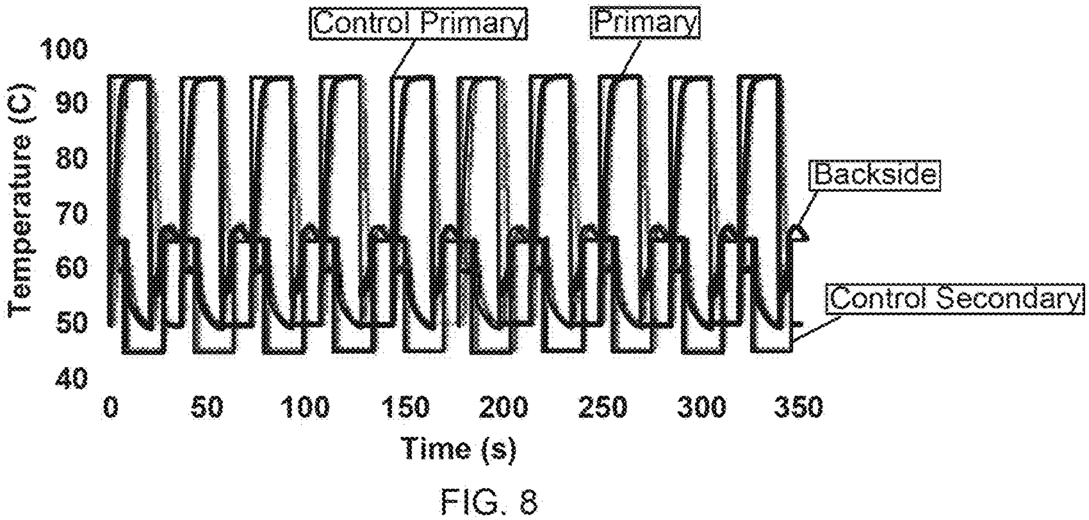
FIG. 8 shows ten successive thermal cycles over a full range of PCR thermo-cycling in accordance with some embodiments of the invention.

FIG. 7 shows an exemplary thermal cycle from a reaction vessel temperature, the traces measured for a thermal cycle from 50° C.→95° C.→50° C. under closed-loop control. Closed-loop heating and cooling rates are ~7° C./sec. The square trace is the desired temperature set-point and the other trace is the measured temperature of the reaction vessel. It was determined the thermal efficiency of the primary TEC was highest with a temperature differential between the PCR tube and the backside of no higher than 30° C., so the backside temperature was controlled to be 65° C. when heating to maximum temperature (PCR tube 95° C.) and 45° C. when cooling the PCR tube to 50° C. (see trace). Once the primary TEC has ramped to higher temperature, the backside temperature could be slowly and controllably driven to a lower temperature in anticipation of the next thermal cycle (see curve). This scheme is analogous to using the backside TEC to properly load a "thermal spring" acting upon the primary TEC, and is applicable for use with PCR systems, because the thermal profile to be applied for a particular PCR assay is known a priori by an assay designer. Note the closed-loop ramp rate for stable and repeatable heating and cooling is ~6.5 seconds for the 45° C. range, as shown for ten successive thermal cycles, as shown in FIG. 8, corresponding to a true closed loop ramp rate ~7° C./sec for both heating and cooling. Performance is maintained throughout multiple cycles over the full thermal-cycling range.

D. Early and Near-Term Reliability Experiments

A typical PCR assay has about 40 thermal cycles from the anneal temperature (~65° C.) to the DNA denaturation temperature (~95° C.) and back to the anneal temperature. For assessing reliability, the prototype module was cycled between 50° C. (on the order of the minimum temperatures used for PCR experiments) and 95° C., with a 10 sec wait time at each temperature to enable system to reach thermal equilibrium.

Figure 9:
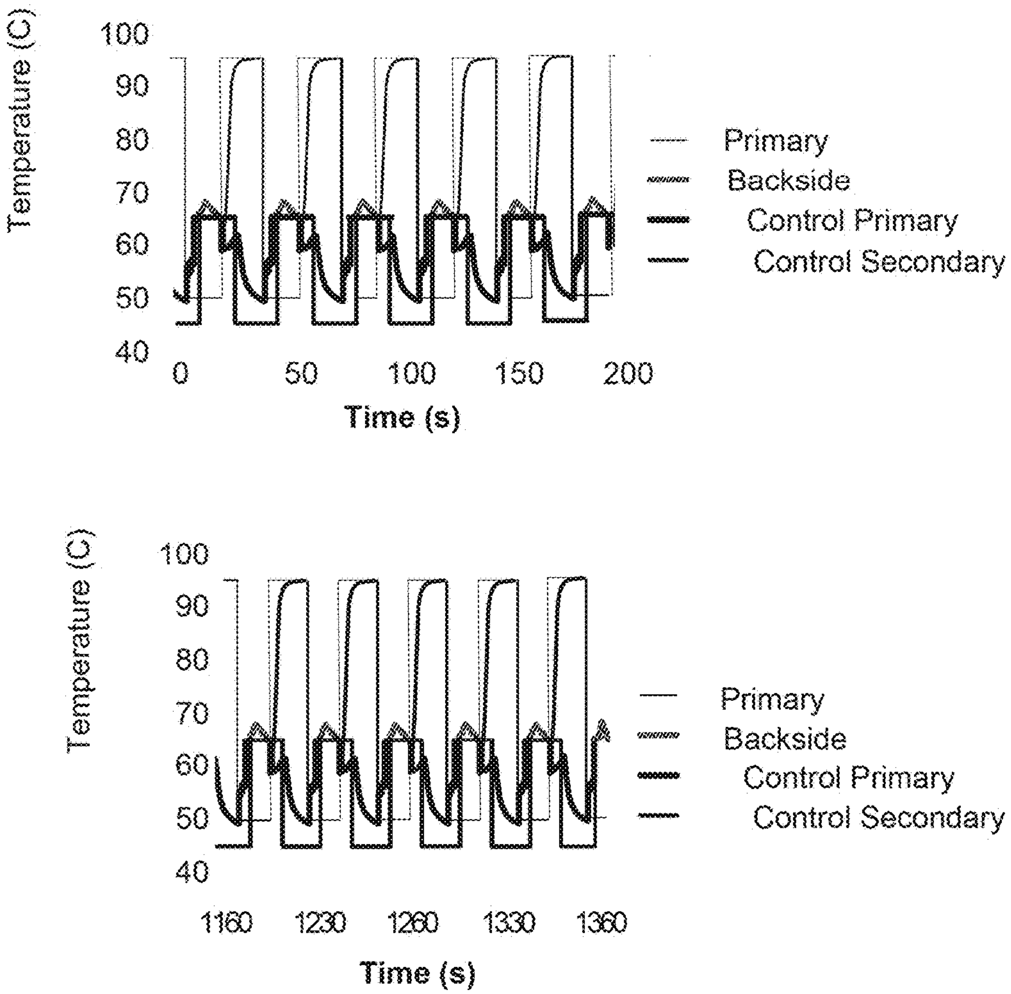
FIG. 9 shows thermo-cycling performance for five cycles at the beginning of thermal cycling and after two days of continuous thermal cycling.
Figure 10:
FIG. 10 shows a diagram of set points used in control loops in accordance with some embodiments of the invention.

FIG. 9 shows a comparison of the first and final 5 cycles of a 5,000 cycle test. Note the time axis of the trace on the right is from a small data-sampling range; 5,000 cycles took approximately 2 days. This module has since been cycled over 10,000 times with maintained performance. As can be seen, thermo-cycling performance for cycles 1-5 (left) remains constant after 5,000 cycles (cycles 4,995-5,000 at right) and there is no change in the thermal performance between the initial and final cycles. This is encouraging for two reasons. First, closed-loop parameters for rapid heating/cooling are quite stable with repeated thermal cycling. Even small thermal instability leads to drift in measured temperature curves for both the primary and backside TECs, quickly escalating to thermal runaway (which would induce an over-current shutdown fault in the firmware). Properly-tuned systems did not display this behavior, demonstrating the robustness of the system. Second, the thermal efficiency of the module is stable over 5,000 cycles. Indeed, this unit has subsequently been cycled >10,000 times without catastrophic failure or gradual erosion of performance.

E. Alternative Designs

Variability in module construction may cause slight differences in device performance. For example, current modules are hand-assembled, with machined heat-sinks and interstitial copper layers, and all components are bonded together by hand using conductive epoxy. Variation in epoxy thickness or creation of small angles between components within the module's sandwich construction cause different thermal performance. Most significantly, thermistors are also attached to the ceramic using thermal epoxy. Small gaps between the thermistor and ceramic lead to errors between the control and measured temperatures.

In some embodiments, the thermal device includes a heating and cooling surface (e.g. TEC device as described herein) on each major face (opposing sides) of the reaction vessel. In such embodiments, optical detection can be performed along the minor face (e.g. edge). In some embodiments, optical detection is performed along a first minor face and optical excitation is performed along a second minor face that is orthogonal to the first minor face. Such embodiments may be particularly useful where heating and cooling of larger fluid volumes are needed (greater than 25 μl fluid samples).

In some embodiments, the thermal control device modules use a custom Peltier device that contains an integrated surface-mount thermistor mounted onto the underside of the ceramic plate in contact with the reaction vessel. A tiny, 0201 package thermistor (0.60 (l)×0.30 (w)×0.23 (t) mm) can be used to minimize convection inside the Peltier device leading to temperature variation by limiting the part thickness. Also, because thermal contact and position of surface-mount thermistors can be precisely controlled, these parts will have very consistent, characterizable differences between the measured and the actual ceramic temperature.

In some embodiments, the thermal control device can include custom Peltiers designed to be fully integrated into a heating/cooling module using semi-conductor mass-production techniques ("pick and place" machines and reflow soldering). The interstitial copper substrate can be substituted for a Bergquist thermal interface PC board (1 mm-thick copper substrate), which have precisely controlled copper thickness and pad dimensions. The Bergquist substrates will also provide pad leads for the backside thermistor and all electrical connections into and out of the module. The backside Peltier will remain a device similar to what is currently used. Finally, the entire TEC assembly can be encapsulated in silicone to make it water resistant. In some embodiments, an aluminum mounting bracket can also double as a heat-sink.

F. Example Commands for Controlling Thermal Cycling with Prototype Device

1. Overview

The system may include, such as on a recordable memory of the system, a list of commands that can be executed within the system to operate the thermal control device in accordance with the principles described herein. These commands are the basic functions can be added together into blocks to build the final functionality for executing heating/cooling and optical detection with in the reaction vessel. The optical blocks can have 5 different LEDs and 6 photodetectors (identified by color), along with a small thermoelectric cooler (TEC) to maintain LED temperature. The thermo-cycling hardware is a dual-TEC module. The commands are broken out by function, Thermocycling and Optical interrogation.

2. Thermo-Cycling Commands:

For clarity, the schematic of the dual-TEC assembly used for PCR is shown in FIG. 1. Note that the Primary TEC interacts with the reaction vessel, and the Secondary TEC manages the overall thermal efficiency of the system to optimize performance. The Primary TEC temperature is monitored using the Primary Thermistor, and the Secondary Thermistor monitors the Secondary TEC.

Figure 11:
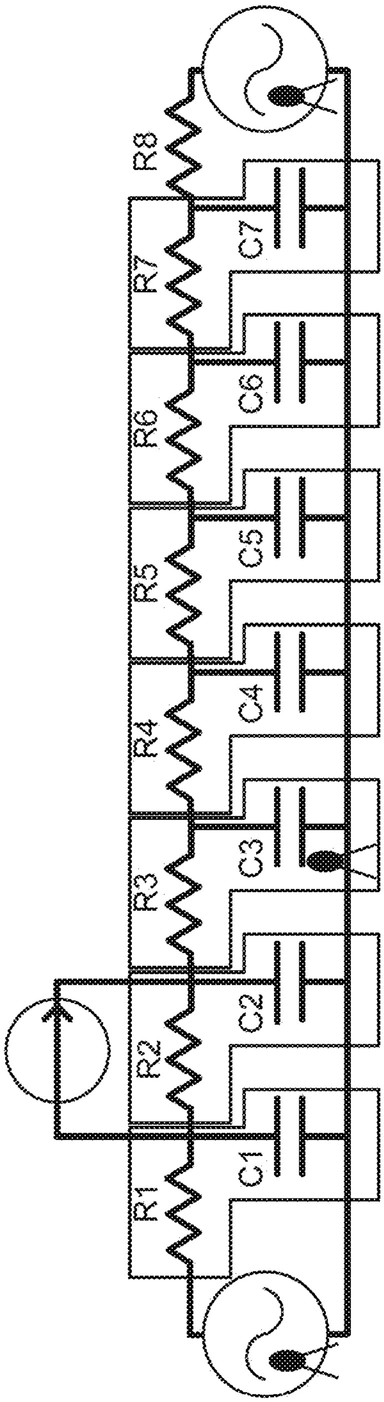
FIG. 11 shows a diagram of set points used in control loops in accordance with some embodiments of the invention.

FIG. 2 shows the schematic of a thermal control device in accordance with some embodiments of the invention, in particular the dual-TEC design of the prototype described herein. Temperature of the PCR reaction vessel (measured by a thermistor, (16) shaded ellipse) is governed by the Primary TEC and controlled by a loop in PSoC firmware. Optimal thermal efficiency of the Primary TEC is maintained by a second thermistor (16') (shaded ellipse) in thermal contact with a copper layer, which feeds into a secondary PSoC loop, controlling a second TEC. FIG. 11 illustrates the rise and fall of the set-points associated with the first and second thermistors.

SETPOINT1: Temperature set-point (in 1/100° C.) for the Primary TEC. Format XXXX.

SETPOINT2: Temperature set-point (in 1/100° C.) for the Secondary TEC. Format XXXX.

PGAINR1: Control loop P gain setting for Primary TEC for INCREASING temperatures. 4 sig. figs.

IGAINR1: Control loop I gain setting for Primary TEC for INCREASING temperatures. 4 sig. figs.

DGAINR1: Control loop D gain setting for Primary TEC for INCREASING temperatures. 4 sig. figs.

PGAINR2: Control loop P gain setting for Secondary TEC for INCREASING temperatures. 4 sig. figs.

IGAINR2: Control loop I gain setting for Secondary TEC for INCREASING temperatures. 4 sig. figs.

DGAINR2: Control loop D gain setting for Secondary TEC for INCREASING temperatures. 4 sig. figs.

PGAINF1: Control loop P gain setting for Primary TEC for DECREASING temperatures. 4 sig. figs.

IGAINF1: Control loop I gain setting for Primary TEC for DECREASING temperatures. 4 sig. figs.

DGAINF1: Control loop D gain setting for Primary TEC for DECREASING temperatures. 4 sig. figs.

PGAINF2: Control loop P gain setting for Secondary TEC for DECREASING temperatures. 4 sig. figs.

IGAINF2: Control loop I gain setting for Secondary TEC for DECREASING temperatures. 4 sig. figs.

DGAINF2: Control loop D gain setting for Secondary TEC for DECREASING temperatures. 4 sig. figs.

DELTARISE: Time difference (in ms) between temperature set-points of Primary and Secondary TECs for INCREASING temperatures, as shown above. For positive DELTARISE values, the activated set-point for the Secondary TEC increases by a user-input value in advance of a temperature step for the Primary TEC. Negative DELTARISE values increases the Secondary TEC set-point after the Primary TEC is active. Format XXXX.

DELTAFALL: Time difference (in ms) between temperature set-points of Primary and Secondary TECs for DECREASING temperatures, as shown above. For positive DELTAFALL values, the activated set-point for the Secondary TEC increases by a user-input value in advance of a temperature step for the Primary TEC. Negative DELTAFALL values increases the Secondary TEC set-point after the Primary TEC is active. Format XXXX.

SOAKTIME: Time (in ms) specified to enable the reaction vessel to thermally equilibrate with the TEC module. No optical reads are to be performed during a soak. Format XXXXX.

HOLDTIME: Time (in ms) specified after each temperature step allocated to make optical reads during standard thermo-cycling. Format XXXXXX.

RAMPPOS: A steady state ramp rate specified by users (in tenths of a degree/sec). This would be used only for legacy assays to slow ramp-up rates to rates less than the maximum attainable under standard PID control. Format XXX.

RAMPNEG: A steady-state ramp rate specified by users (in tenths of a degree/sec). This would be used only for legacy assays to slow ramp-down rates to rates less than the maximum attainable under standard PID control. Format XXX.

WAITTRIGGER: Puts ICORE into idle until an external trigger pulse is received.

ADDTRIGGER: Appends an external trigger pulse after a step is completed.

MANUAL TRIGGER: Executes a manual trigger pulse.

FANPCR: On/off bit for fans(s) backing the heat-sink on the dual-TEC module for PCR.

3. Optical Commands:

SETPOINT3: Temperature set-point (in 1/100° C.) for the Optics Block TEC. Format XXXX.

PGAIN3: Control loop P gain setting for Optics TEC. 4 sig. figs.

IGAIN3: Control loop I gain setting for Optics TEC. 4 sig. figs.

DGAIN3: Control loop D gain setting for Optics TEC. 4 sig. figs.

FANOPTICS: On/off bit for fan backing the heat-sink on the Optics Block TEC.

Matrix values for optical reads for each LED/Detector pair. Valid fluorescence channels are shown in each color for the appropriate LED. See below in Table 2 for more detail.

TABLE 2

| Fluorescence Channels for Optical Detection | | | | | | |
|---|---|---|---|---|---|---|
| LED/ DET | 0 (Blue) | 1 (Green) | 2 (Yellow) | 3 (Red) | 4 (Deep Red) | 5 (IR) |
| 0 (UV) | 00 | 01 | 02 | 03 | 04 | 05 |
| 1 (Blue) | 10 | 11 | 12 | 13 | 14 | 15 |
| 2 (Green) | 20 | 21 | 22 | 23 | 24 | 25 |
| 3 (Yellow) | 30 | 31 | 32 | 33 | 34 | 35 |
| 4 (Red) | 40 | 41 | 42 | 43 | 44 | 45 |

READCHANNEL: Specify which LED/Detector pair(s) are read for each optical read. Accommodate a string between 1 and 30 matrix pairs, space separated. For example, to read the Deep Red and IR detectors with Red LED illumination, the command would be "READCHANNEL 44 45." Fluorescence signals are only produced at longer wavelengths than the excitation color; valid signals are shown in color for each LED in the table above.

READFLUORESCENCE 0: Reads all appropriate detectors for UV excitation (00, 01, 02, 03, 04, and OS).
READFLUORESCENCE 1: Reads all appropriate detectors for Blue excitation (11, 12, 13, 14, and 15).
READFLUORESCENCE 2: Reads all appropriate detectors for Green excitation (22, 23, 24, and 25).
READFLUORESCENCE 3: Reads all appropriate detectors for Yellow excitation (33, 34, and 35).
READFLUORESCENCE 4: Reads all appropriate detectors for Red excitation (44 and 45).
LEDWU: Warm-up time for LEDs prior to beginning an optical reading (in ms). Format XXXX.
OPTICSINT: Integration time for an optical read (in ms). Format XXXX.
PLL: On/off bit for phase-locked-loop detection mode (otherwise known as AC-mode). AC-mode pulses
LEDs at a fixed frequency (generated in PSoC) and detectors are read using a phase-locked loop scheme.
LEDCURRENT X: Set LED current (in mA), XXXX. Format example: LEDCURRENT 0 300: set UV LED to 300 mA. When AC-mode is enabled (PLL on), LEDCURRENT sets the DC-offset level for a LED current, upon which a pulse is super-imposed.
LEDSLEWDEPTH X: For AC-mode only, LEDSLEWDEPTH sets the magnitude of the AC component of the LED drive signal (in mA). Slew depth is specified as the magnitude between the mean and the maximum current applied to an LED, and is used in conjunction with LEDCURRENT command. For example, to drive the Red LED with a symmetrical pulse that ranges from 0-100 mA, there is a 50 mA DC offset (LEDCURRENT 4 SO) and a pulse of +/−50 mA (LEDSLEWDEPTH 4 50).
LEDPULSESHAPE X: Specifies the shape of the input drive current for an LED in AC-mode (sine, triangle, delta function, other shape).

G. Thermal Modeling Approach for Controlling Thermal Cycling

In another aspect, the thermal control device can be configured to control temperature based on thermal modeling. This aspect can be used in a thermal control device configured for one-sided heating or two-sided heating. In some embodiments, such devices include a first thermoelectric cooler and another thermal manipulation device, each being coupled to a controller that controls the first thermoelectric cooler in coordination with the thermal manipulation device to improve control, speed and efficiency in heating and/or cooling with the first thermoelectric cooler. It is appreciated, however, that this thermal modeling aspect can be incorporated into the controls of any of the configurations described herein.

An example of such an approach is illustrated in the state model diagram shown in FIG. 11. This figure illustrates a seven state model for use with a single-sided version of the thermal control device. This model applies electrical theories to model real world thermal system of the temperature that include the temperatures of the thermoelectric cooler faces, the reaction vessel, and the fluid sample within the reaction vessel. The diagram shows the seven states of the model and the three measured states used in the Kalman algorithm to arrive at an optimal estimation of the reaction vessel contents assuming it is water.

In the circuit model of FIG. 11, capacitors represent material thermal capacitance, resistors represent material thermal conductivity, voltage at each capacitor and source represents temperature, and the current source represents thermal power input from the front side thermoelectric cooler (TEC), adjacent to the reaction vessel face. In this embodiment, inputs to the model are the backside TEC temperature can be predicted from model T1-T7, the front side thermoelectric cooler heat input (Watts), and the "Block" temperature which lies adjacent to the opposite vessel face. This completes the model portion of the algorithm. As previously noted, Kalman algorithms typically use a model in conjunction with measured sensor signal/signals that are also part of the model outputs. Here, the measured thermistor signals converted to temperature are used for the front side thermoelectric cooler, and also for the backside thermoelectric cooler. For the case of the backside measured temperature, it is not an output of the model, but it is assumed that they are the same. One reason for this assumption is that the R1 is negligible in terms of overall thermal conductance.

Figure 12:
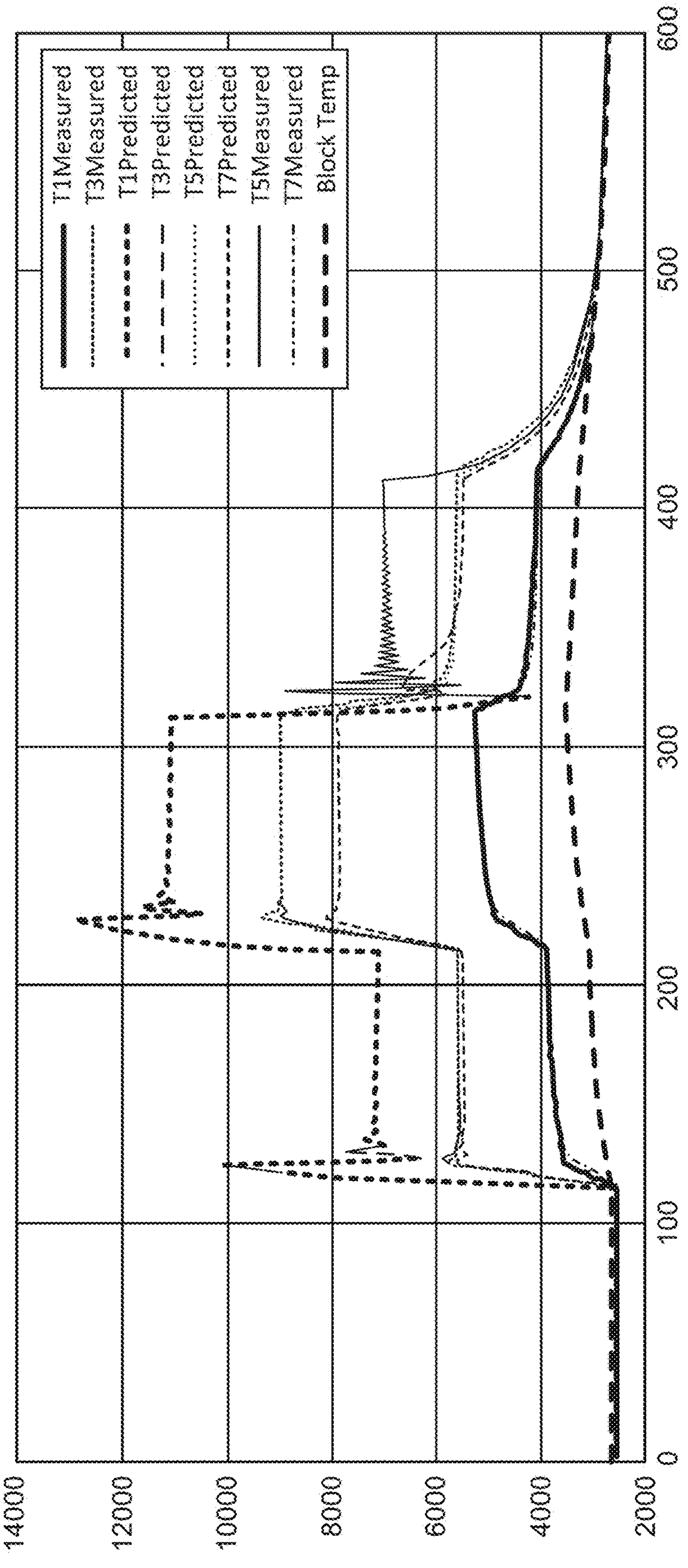
FIG. 12 shows a graph of inputs and measured temperature values during thermal cycling controlled by a thermal model in accordance with some embodiments of the invention.

FIG. 12 illustrates one-sided heating and cooling system, which demonstrates the high level of accuracy of this model when coupled to optimal estimation techniques. The model inputs (T1 Measured, Block Temp, and Input Watts from the front side thermoelectric cooler) are shown along with the actual measured values (T1Measured, T3Measured, T5Measured, and BlockTemp), which are used to fine tune the R and C parameters so that all predicted and measured curves overlap when the model is run.

As is evident from this graph, it is possible to obtain a very accurate and realistic predicted reaction vessel temperature which can then be used as feedback in the closed-loop thermal control. This data is also indicative of the ability to know how the temperature is changing dynamically during heat up and cool down phases of the process and the impact of ambient temperature on the thermal control setpoints necessary to create a particular reaction vessel temperature. These features prove to be powerful tools for future assay and instrument development endeavors. Further, while the model shown here is valid for a one-sided heating/cooling system, this concept can be expanded to account for a dual-sided active heating/cooling module.

For validation, an instrumented reaction vessel can be used, whereby a thermocouple was inserted into the reaction chamber of the vessel. Validation can be carried out by performing a series of experiments where the initial conditions for the C and R values are taken from known physical material properties.

Figure 13:
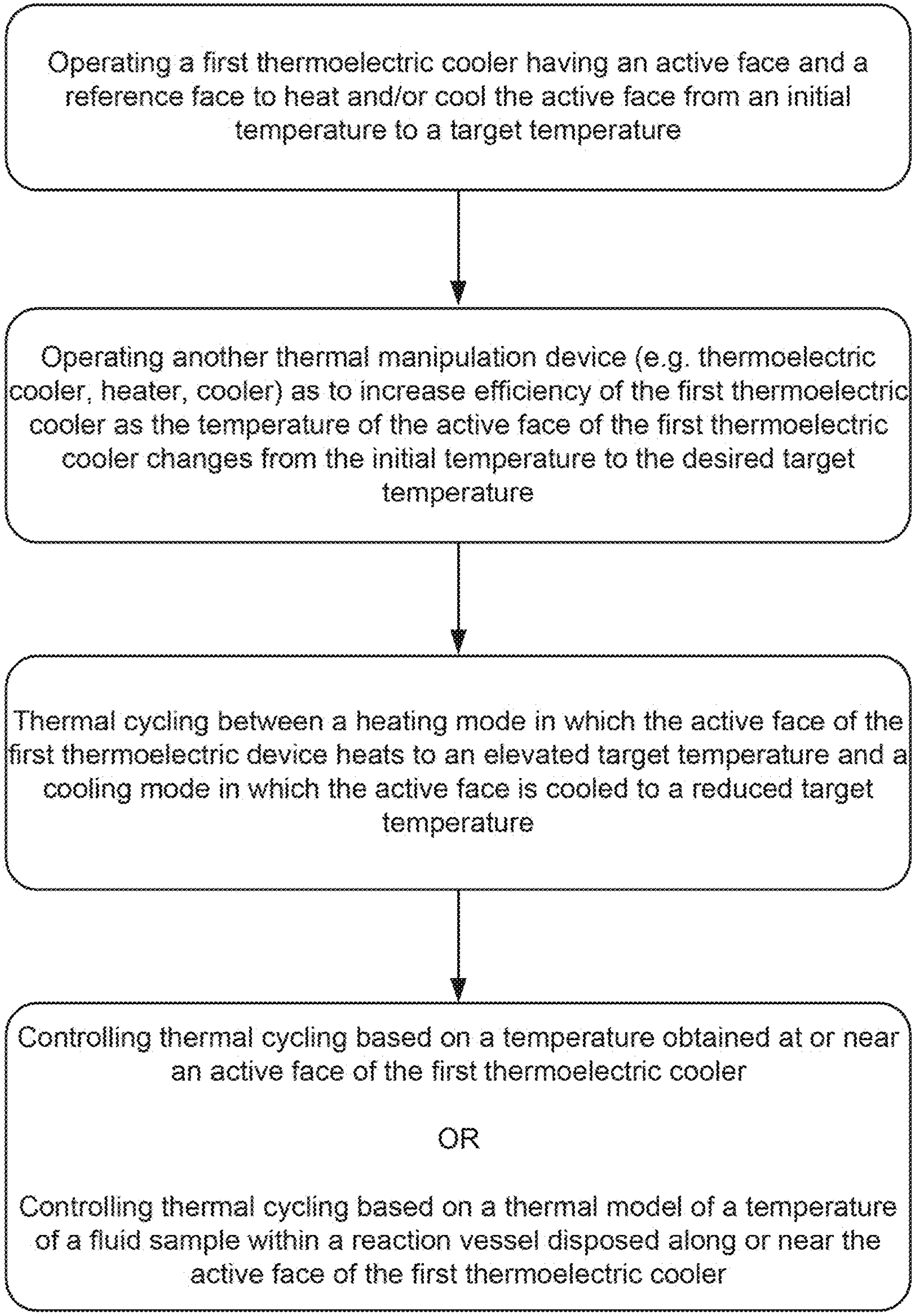
FIGS. 13-15 show methods of controlling thermal cycling in accordance with some embodiments of the invention.
Figure 14:
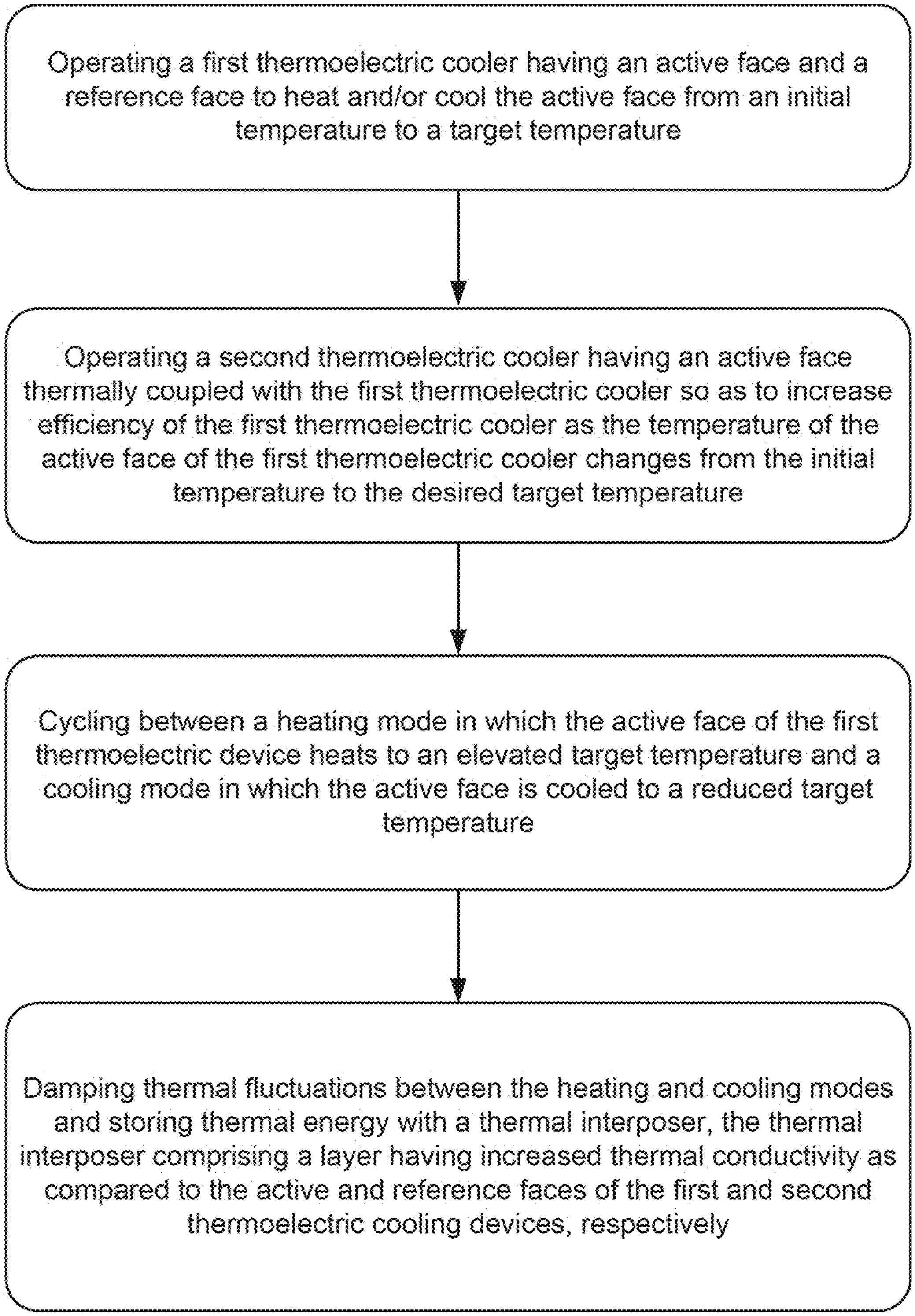
Figure 15:
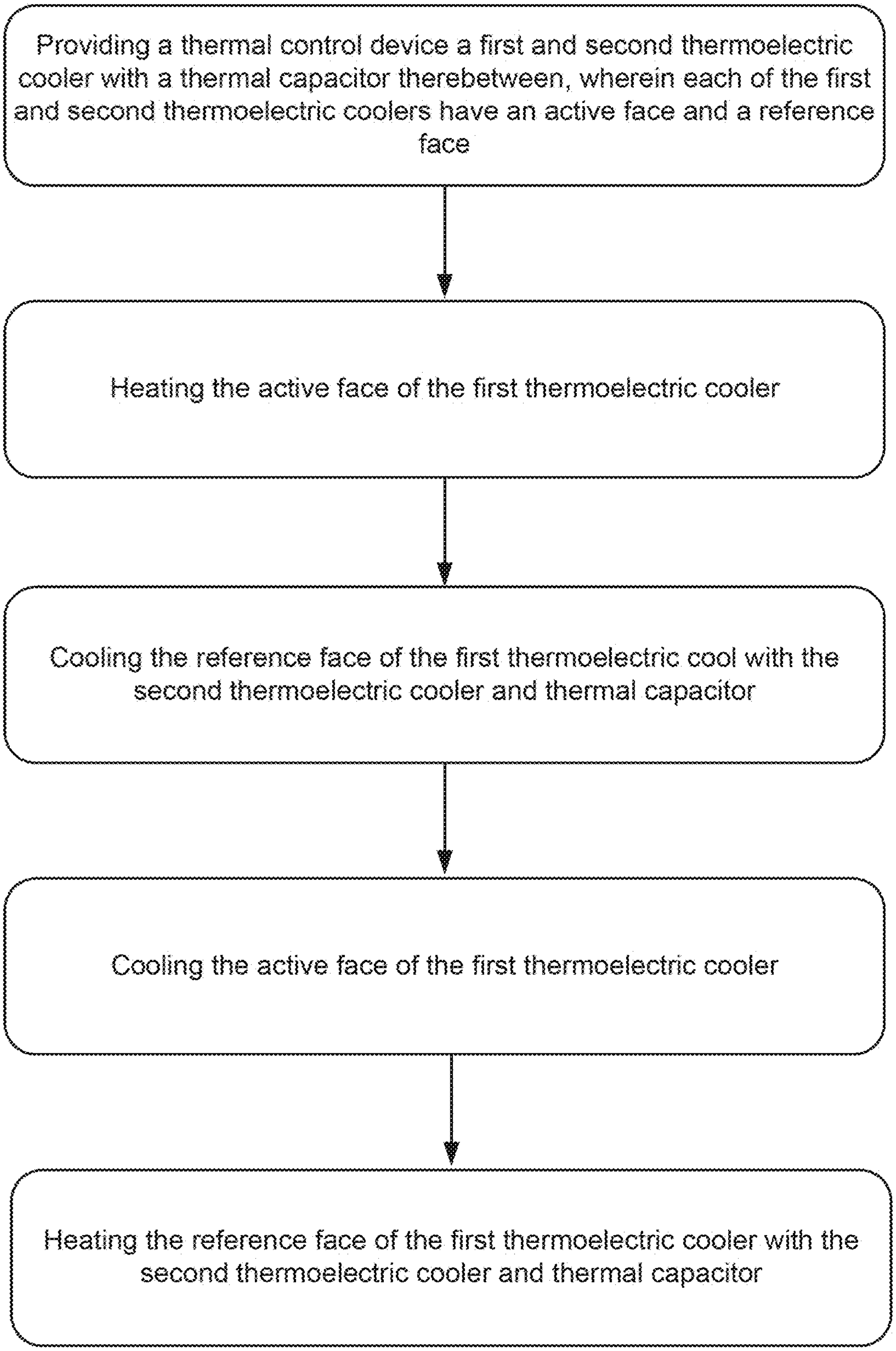

Methods of thermal cycling in accordance with embodiments of the invention are also provided herein, as shown in the examples of FIGS. 13-15. The method depicted in FIG. 13 includes: operating a first thermoelectric cooler having an active face and a reference face to heat and/or cool the active face from an initial temperature to a target temperature; operating another thermal manipulation device (e.g. thermoelectric cooler, heater, cooler) as to increase efficiency of the first thermoelectric cooler as the temperature of the active face of the first thermoelectric cooler changes from the initial temperature to the desired target temperature; thermal cycling between a heating mode in which the active face of the first thermoelectric device heats to an elevated target temperature and a cooling mode in which the active face is cooled to a reduced target temperature. The method further includes controlling thermal cycling by one of two approaches. A first approach, controls thermal cycling, at least in part, based on a temperature obtained at or near an active face of the first thermoelectric cooler. A second approach controls thermal cycling is based, at least in part, on a thermal model of a temperature of a fluid sample within a reaction vessel disposed along or near the active face of the first thermoelectric cooler.

FIG. 14 depicts a method that includes operating a first thermoelectric cooler having an active face and a reference face to heat and/or cool the active face from an initial temperature to a target temperature and operating a second thermoelectric cooler having an active face thermally coupled with the first thermoelectric cooler so as to increase efficiency of the first thermoelectric cooler as the temperature of the active face of the first thermoelectric cooler changes from the initial temperature to the desired target temperature. As described previously, a thermal manipulation device, such as a thermo-resistive heater, can be used instead of the second thermoelectric cooler. Typically, such methods further include cycling between a heating mode in which the active face of the first thermoelectric device heats to an elevated target temperature and a cooling mode in which the active face is cooled to a reduced target temperature. In some embodiments, methods include damping thermal fluctuations between the heating and cooling modes and storing thermal energy with the thermal capacitor or interposer, which includes a layer having increased thermal conductivity as compared to the active and reference faces of the first and second thermoelectric cooling devices, respectively. Such methods can further include use of a control loop using temperature sensors inputs from the active face and/or the thermal interposer to further improve speed and efficiency when cycling.

FIG. 15 depicts a method that includes: operating a thermal control device a first and second thermoelectric cooler with a thermal capacitor there between, each of the first and second thermoelectric coolers having an active face and a reference face, and heating the active face of the first thermoelectric cooler. Such methods can further utilize a thermal manipulation device, such a thermo-resistive heater, to replace the second thermoelectric cooler. The method then includes: cooling the reference face of the first thermoelectric cool with the second thermoelectric cooler and thermal capacitor and cooling the active face of the first thermoelectric cooler, then heating the reference face of the first thermoelectric cooler with the second thermoelectric cooler and thermal capacitor. Such methods can further utilize a thermal capacitor or thermal interposer between the thermoelectric coolers to further improve speed and efficiency when thermal cycling.

In the foregoing specification, the invention is described with reference to specific embodiments thereof, but those skilled in the art will recognize that the invention is not limited thereto. Various features, embodiments and aspects of the above-described invention can be used individually or jointly. Further, the invention can be utilized in any number of environments and applications beyond those described herein without departing from the broader spirit and scope of the specification. The specification and drawings are, accordingly, to be regarded as illustrative rather than restrictive. It is recognized that the terms "comprising," "including," and "having," as used herein, are specifically intended to be read as open-ended terms of art.

What is claimed is:

1. A method of thermal cycling in a polymerase chain reaction process, the method comprising:

engaging a thermal control device with a reaction vessel having a sample therein for performing a polymerase chain reaction for amplifying a target polynucleotide such that an active face of the first thermoelectric cooler thermally engages the reaction vessel so that operation of the first thermoelectric cooler changes a temperature of the reaction vessel to a desired target temperature in accordance with a thermal cycling protocol, wherein the thermal control devices comprises:

a first thermoelectric cooler having an active face and a reference face;

a second thermoelectric cooler having an active face and a reference face;

a thermal interposer disposed between the first and second thermoelectric coolers such that the reference face of the first thermoelectric cooler is thermally coupled with the active face of the second thermoelectric cooler through the thermal interposer; and a controller operatively coupled to each of the first and second thermoelectric coolers, the controller configured to operate the second thermoelectric cooler concurrent with the first thermoelectric cooler so as to increase efficiency of the first thermoelectric cooler as a temperature of the active face of the first thermoelectric cooler changes from an initial temperature to the desired target temperature; and thermal cycling the thermal control device according to the thermal cycling protocol for amplifying the target polynucleotide, wherein thermal cycling comprises cycling between a heating mode in which the active face of the first thermoelectric device heats to an elevated target temperature and a cooling mode in which the active face is cooled to a reduced target temperature, wherein, during heating and cooling, operation of the second thermoelectric cool varies a temperature of the thermal interposer in coordination with operation of the first thermoelectric cooler such that the thermal interposer acts as a thermal capacitor to facilitate controlled storage and release of thermal energy thereby improving speed and efficiency of the thermal cycling.

2. The method of claim 1 wherein engaging the thermal control device with the reaction vessel comprises engaging the active face of the first thermoelectric cooler against one side of the reaction vessel such that an opposite side remains uncovered by the thermal device to allow optical detection from the opposite side.

3. The method of claim 1, wherein each of the heating mode and the cooling mode have one or more operative parameters, wherein the one or more operative parameters are asymmetric between the heating and cooling mode.

4. The method of claim 3, wherein each of the heating mode and cooling mode has a bandwidth and a loop gain, wherein the band width and the loop gains of the heating mode and cooling mode are different.

5. The method of claim 1, wherein the thermal interposer is a thermal capacitor formed of a layer of a thermally conductive material having higher mass than that of the active and reference faces of the first and second thermoelectric coolers.

6. The method of claim 1, wherein the device further comprises:

a first temperature sensor adapted to sense the temperature of the active face of the first thermoelectric cooler; and a second temperature sensor adapted to sense a temperature of the thermal capacitor.

7. The method of claim 5, wherein the first and second temperature sensors are coupled with the controller such that operation of the first and second thermoelectric coolers is based, at least in part, on an input from the first and second temperature sensors to the controller.

8. The method of claim 5, wherein the second temperature sensors is in thermal contact with the thermally conductive material of the thermal capacitor.

9. The method of claim 1, wherein the thermal capacitor is a layer of copper with a thickness of about 5 mm or less.

10. The method of claim 1, wherein the thermal capacitor is a layer of copper with a thickness of about 1 mm or less.

11. The method of claim 5, wherein the controller comprises:

a primary control loop into which the input of the first temperature sensor is provided, and a secondary control loop into which the input of the second temperature sensor is provided.

12. The method of claim 11 wherein the controller is configured such that a bandwidth response of the primary control loop is timed faster than a bandwidth response of the secondary control loop.

13. The method of claim 11, wherein each of the primary and secondary control loops are closed-loop.

14. The method of claim 11, wherein the controller is configured to cycle between a heating cycle in which the active face of the first thermoelectric cooler is heated to an elevated target temperature and a cooling cycle in which the active face of the first thermoelectric cooler is cooled to a reduced target temperature.

15. The method of claim 14, wherein the controller is configured such that the secondary control loop switches the second thermoelectric cooler between heating and cooling modes before the first control loop is switched between heating and cooling so as to thermally load the thermal capacitor.

16. The method of claim 14, wherein the secondary control loop maintains a temperature of the thermal capacitor within about 40° C. from the temperature of the active face of the first thermoelectric cooler.

17. The method of claim 14, wherein the controller maintains efficiency of the first thermoelectric cooler by operating the second thermoelectric cooler such that heating and cooling with the active face of the first thermoelectric cooler occurs at a ramp rate of within 10° C. per second or less.

18. The method of claim 14, wherein the elevated target temperature is about 90° C. or greater and the reduced target temperature is about 40° C. or less.

19. The method of claim 14, further comprising:

cooling with a heat sink coupled with the reference face of the second thermoelectric cooler to prevent thermal runaway during thermal cycling.

20. The method of claim 19 wherein a thickness from the active face of the first thermoelectric cooler to an opposite facing side of the heat sink is about 20 mm or less.

21. The method of claim 1 wherein a planar size of the thermal control device has a length of about 45 mm or less and a width of about 20 mm or less.

22. The method of claim 21 wherein the planar size has a length of about 40 mm and a width of about 12.5 mm.

23. The method of claim 1, wherein the active face of the first thermoelectric cooler is about 11 mm by 13 mm.

24. The method of claim 23 wherein the thermal control device engages with a reaction vessel for thermal cycling of the reaction vessel on a single side thereof to allow optical detection of a target analyte from an opposing side of the reaction vessel.

* * * * *